(12) United States Patent
Kudo et al.

(10) Patent No.: US 7,167,425 B2
(45) Date of Patent: Jan. 23, 2007

(54) DUBBING APPARATUS

(75) Inventors: Shigetaka Kudo, Tokyo (JP); Yuji Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/201,361

(22) Filed: Aug. 10, 2005

(65) Prior Publication Data

US 2006/0044969 A1 Mar. 2, 2006

Related U.S. Application Data

(63) Continuation of application No. 10/221,985, filed on Feb. 3, 2003, now Pat. No. 7,031,238.

(30) Foreign Application Priority Data

Jan. 19, 2001 (JP) ............................ P2001-011581
Jan. 18, 2002 (JP) ...................... PCT/JP02/00355

(51) Int. Cl.
*G11B 5/86* (2006.01)
*G11B 7/00* (2006.01)

(52) U.S. Cl. ........................ 369/47.12; 360/15; 360/39; 360/13; 369/83; 369/47.11

(58) Field of Classification Search ...................... None
See application file for complete search history.

(56) References Cited

U.S. PATENT DOCUMENTS

| | | | | |
|---|---|---|---|---|
| 5,253,078 A | | 10/1993 | Balkanski et al. ............ 382/250 |
| 5,504,728 A | * | 4/1996 | Yokota et al. ............. 369/53.24 |
| 5,724,322 A | * | 3/1998 | Kondo et al. ............. 369/30.09 |
| 5,768,528 A | * | 6/1998 | Stumm ........................ 709/231 |
| 5,883,865 A | * | 3/1999 | Kondo et al. ............. 369/30.08 |
| 5,890,169 A | | 3/1999 | Wong et al. ................. 707/206 |
| 5,920,535 A | * | 7/1999 | Hisamatsu et al. ........... 369/83 |
| 6,097,557 A | * | 8/2000 | Inoue et al. .................. 360/13 |
| 6,151,286 A | * | 11/2000 | Inoue .......................... 369/84 |
| 6,366,953 B1 | * | 4/2002 | Inoue ......................... 709/219 |
| 6,378,031 B1 | | 4/2002 | Kuno et al. .................... 711/4 |
| 6,388,965 B1 | * | 5/2002 | Ozawa et al. ............ 369/47.12 |
| 6,389,399 B1 | | 5/2002 | Yasuda ....................... 704/500 |
| 6,493,299 B1 | * | 12/2002 | Sato ........................ 369/47.12 |
| 6,529,452 B1 | * | 3/2003 | Tabuchi et al. .......... 369/30.05 |
| 6,631,100 B1 | * | 10/2003 | Utsumi .................... 369/30.27 |
| 6,804,181 B1 | * | 10/2004 | Fujisawa et al. ......... 369/47.12 |
| 7,031,238 B1 | * | 4/2006 | Kudo et al. .............. 369/47.12 |

(Continued)

FOREIGN PATENT DOCUMENTS

GB 2-340-293 A 2/2000

(Continued)

*Primary Examiner*—Wayne Young
*Assistant Examiner*—Dismery Mercedes
(74) *Attorney, Agent, or Firm*—Finnegan, Henderson, Farabow, Garrett & Dunner, L.L.P.

(57) ABSTRACT

A dubbing apparatus to dub data managed per program like audio data such as a piece of music is provided. In the dubbing apparatus, for passing output data read from a CD through a CD drive for compression of the data and transferring the compressed data for recording to an HD drive, an HD TOC being breakpoint information is generated based on specified information indicative of a track break of output data read from the HD drive. The HD drive generates a FAT based on the HD TOC. In the HD drive, the dubbed data can be managed per track accurately and properly without having to monitor any information indicative of each track break such as sub Q data synchronously with a stream of dubbing data.

10 Claims, 21 Drawing Sheets

U.S. PATENT DOCUMENTS

2001/0033531 A1* 10/2001 Ozawa et al. ............ 369/47.12
2002/0060811 A1    5/2002 Inoue et al.
2004/0013058 A1*  1/2004 Kudo ...................... 369/47.12

FOREIGN PATENT DOCUMENTS

| | | |
|---|---|---|
| JP | 1-312793   | 12/1989 |
| JP | 4-28079    | 1/1992  |
| JP | 4-47580    | 2/1992  |
| JP | 11-259971  | 9/1999  |
| JP | 2000-57747 | 2/2000  |

* cited by examiner

|   | 16bits | | 16bits | | |
|---|---|---|---|---|---|
|   | MSB　　　LSB | MSB　　　LSB | MSB　　　LSB | MSB　　　LSB | |
| H { | 00000000 | 11111111 | 11111111 | 11111111 | 0 |
|   | 11111111 | 11111111 | 11111111 | 11111111 | 1 |
|   | 11111111 | 11111111 | 11111111 | 00000000 | 2 |
|   | Cluster H | Cluster L | Sector | 00000010 | 3 |
|   | 00000000 | 00000000 | 00000000 | 00000000 | 4 |
|   | 00000000 | 00000000 | 00000000 | 00000000 | 5 |
|   | 00000000 | 00000000 | 00000000 | 00000000 | 6 |
|   | Maker code | Model code | First TNO | Last TNO | 7 |
|   | 00000000 | 00000000 | 00000000 | Used Sectors | 8 |
|   | 00000000 | 00000000 | 00000000 | 00000000 | 9 |
|   | 00000000 | 00000000 | 00000000 | Disc Serial No | 10 |
|   | Disc | ID | P-DFA | P-EMPTY | 11 |
|   | P-FRA | P-TNO 1 | P-TNO 2 | P-TNO 3 | 12 |
| T { | P-TNO 4 | P-TNO 5 | P-TNO 6 | P-TNO 7 | 13 |
|   | P-TNO 248 | P-TNO 249 | P-TNO 250 | P-TNO 251 | 74 |
|   | P-TNO 252 | P-TNO 253 | P-TNO 254 | P-TNO 255 | 75 |
|   | 00000000 | 00000000 | 00000000 | 00000000 | 76 |
|   | 00000000 | 00000000 | 00000000 | 00000000 | 77 |
| (01h) | START ADDRESS | | | TRACK MODE | 78 |
|   | END ADDRESS | | | LINK INFORMATION | 79 |
| (02h) | START ADDRESS | | | TRACK MODE | 80 |
|   | END ADDRESS | | | LINK INFORMATION | 81 |
| (03h) | START ADDRESS | | | TRACK MODE | 82 |
|   | END ADDRESS | | | LINK INFORMATION | 83 |
| (FCh) | START ADDRESS | | | TRACK MODE | 580 |
|   | END ADDRESS | | | LINK INFORMATION | 581 |
| (FDh) | START ADDRESS | | | TRACK MODE | 582 |
|   | END ADDRESS | | | LINK INFORMATION | 583 |
| (FEh) | START ADDRESS | | | TRACK MODE | 584 |
|   | END ADDRESS | | | LINK INFORMATION | 585 |
| (FFh) | START ADDRESS | | | TRACK MODE | 586 |
|   | END ADDRESS | | | LINK INFORMATION | 587 |

FIG.7

| FRAME | SUB-CODING FRAME | | | | | | | |
|---|---|---|---|---|---|---|---|---|
| 98n+1 | SYNC PATTERN | | | | | | | |
| 98n+2 | SYNC PATTERN | | | | | | | |
| 98n+3 | P1 | Q1 | R1 | S1 | T1 | U1 | V1 | W1 |
| 98n+4 | P2 | Q2 | R2 | S2 | T2 | U2 | V2 | W2 |
| ⋮ | ⋮ | ⋮ | ⋮ | ⋮ | ⋮ | ⋮ | ⋮ | ⋮ |
| 98n+97 | P95 | Q95 | R95 | S95 | T95 | U95 | V95 | W95 |
| 98n+98 | P96 | Q96 | R96 | S96 | T96 | U96 | V96 | W96 |
| 98(n+1)+1 | | | | | | | | |

FIG.10A

| Q1~Q4 CONTROL | Q5~Q8 ADR | Q9~Q80 SUB Q DATA | Q81~Q96 CRC |
|---|---|---|---|

FIG.10B

| TNO | BLOCK NO. | POINT | PMIN, PSEC, PFRAME | |
|---|---|---|---|---|
| 00 | n | 01 | 00, 02, 32 | START POINT OF TRACK #1 |
| ↓ | n+1 | 01 | 00, 02, 32 | |
| | n+2 | 01 | 00, 02, 32 | |
| | n+3 | 02 | 10, 15, 12 | START POINT OF TRACK #2 |
| | n+4 | 02 | 10, 15, 12 | |
| | n+5 | 02 | 10, 15, 12 | |
| | n+6 | 03 | 16, 28, 63 | START POINT OF TRACK #3 |
| | n+7 | 03 | 16, 28, 63 | |
| | n+8 | 03 | 16, 28, 63 | |
| | n+9 | 04 | • • | |
| | n+10 | 04 | • • | |
| | n+11 | 04 | • • | |
| | n+12 | 05 | • • | |
| | n+13 | 05 | • • | |
| | n+14 | 05 | • • | |
| | n+15 | 06 | 49, 10, 03 | START POINT OF TRACK #6 |
| | n+16 | 06 | 49, 10, 03 | |
| | n+17 | 06 | 49, 10, 03 | |
| | n+18 | A0 | 01, 00, 00 | TRACK NO. OF FIRST TRACK ON DISC |
| | n+19 | A0 | 01, 00, 00 | |
| | n+20 | A0 | 01, 00, 00 | |
| | n+21 | A1 | 06, 00, 00 | TRACK NO. OF LAST TRACK ON DISC |
| | n+22 | A1 | 06, 00, 00 | |
| | n+23 | A1 | 06, 00, 00 | |
| | n+24 | A2 | 52, 48, 41 | START POINT OF LEAD-OUT TRACK |
| | n+25 | A2 | 52, 48, 41 | |
| 00 | n+26 | A2 | 52, 48, 41 | |
| 00 | n+27 | 01 | 00, 02, 32 | SAME AS ABOVE |
| ↓ | n+28 | 01 | 00, 02, 32 | ↓ |
| | • | • | • • | |
| | • | • | • • | |
| | • | • | • • | |

FIG.12

| FILE NAME | EXTENSION | ATTRIBUTE | RESERVE | TIME | DATA | TOP CLUSTER | SIZE |
|---|---|---|---|---|---|---|---|

FIG.15

DUBBING APPARATUS

This application is a continuation of U.S. application Ser. No. 10/221,985, filed Feb. 3, 2003 now U.S. Pat. No. 7,031,238.

TECHNICAL FIELD

The present invention generally relates to a dubbing apparatus, and more particularly to a dubbing apparatus capable of dubbing data managed per program like audio data such as a musical composition or a piece of music.

BACKGROUND ART

Conventionally, there are widely used various types of digital audio apparatuses capable of recording or playing audio data. For example, a HD drive being an apparatus capable of playing CD (compact disc) is widely used, and also a disc medium to and from which audio data can be written and read, such as a mini disc (MD) for example and a recorder/player compatible with such a disc medium are in widespread use.

In the systems such as the MD drive and CD drive, audio data is managed per so-called "program". In the following description, "program" will refer to a group of data recorded under management as one unit in a disc. In the case of audio data for example, one piece of music is equivalent to the "program". It should be noted that a piece of music is generally called one "track" and so a "program" will also be called "track" in the following description.

Recently, it has been proposed to use a hard disc (HD) drive for writing and reading the above audio data. The currently available hard disc has a considerably large capacity as compared to the disc media such as an MD for example, and thus can store a far larger volume of data as music signals than the MD and the like.

The above leads to thinking it up to build a digital audio system having integrated therein a CD drive, MD drive and a hard disc drive.

Such a system may be adapted to record or "dub" audio data read from a CD for example to an MD or hard disc or to dub audio data recorded in a hard disc to an MD.

Data recorded in a medium such as a CD, MD or the like is managed per track. The recorded-data management per track is effected based on a TOC (table of contents) recorded in a recording area different from a one in which audio data is recorded, in both the CD and MD.

Assume here that audio data read from a CD or MD as a dubbing source is dubbed to a hard disc and multiple continuous tracks recorded in a disc as the dubbing source are recorded by one dubbing operation.

In this case, a stream of audio data for the multiple tracks will be transferred to a hard disc drive and written to a hard disc in the drive.

It will be more user-friendly to manage multiple tracks of audio data thus dubbed to the hard disc per track as in the CD or MD than to manage the audio data as one track (file).

Description will be made of dubbing of audio data to an MD for example. In this case, a certain method is used to detect a breakpoint of each piece of music in a stream of the audio data, and the TOC is updated at each time taking the detected breakpoint as those of the music piece. Thus, the dubbed audio data is managed per track. More specifically, it is assumed that input digital audio data is in compliance with a CD format and there exists sub Q data as sub-code data. In this case, the continuity of the sub Q data within the track unit is monitored and a data position where the continuity is lost is registered as a breakpoint of the track in the TOC. Alternatively, a no-sound interval longer than a predetermined length of time in the audio data is registered as a breakpoint of the track. As it is well known, the sub Q data inserted in digital audio data in the CD format includes time indication indicative of a play time of each track, and discontinuity of the time information can be regarded as a track breakpoint.

However, some digital audio data have no sub-code data inserted therein. In this case, the detection of a track breakpoint depending upon the existence of the sub Q data is impossible. In this case, however, it suffices to detect a no-sound interval longer than the predetermined length of time. Even when a digital audio data is divided in two tracks in the TOC for example, the sound in one track is continuos to that in the other track in some cases. On the contrary, even one track has a no-sound interval long enough to be determined as a track breakpoint as the case may be. Therefore, it is difficult to accurately determine a track breakpoint depending upon the detection of a no-sound interval.

The above programs take place also in dubbing an audio source read from a CD or MD for example to a hard disc (HD). More specifically, it is assumed for example that dubbing is made to a hard disc to enhance the recording efficiency in the above-mentioned dubbing system. In this case, to always record a digital audio data having undergone audio compression, the less reliable no-sound interval detection has to be adopted since the audio-compressed data does not include any sub-code information as in the CD format.

With the conventional method of track delimiting for dubbing by detecting a track breakpoint from the state of an audio data stream and generating management information based on the result of detection, it is difficult to always determine a track breakpoint with a high accuracy for management of the audio data.

DISCLOSURE OF THE INVENTION

Accordingly, the present invention has an object to overcome the above-mentioned drawbacks of the prior art by providing an improved and novel dubbing apparatus.

The above object can be attained by providing a dubbing apparatus including, according to the present invention, a source output unit to output data by a succession of program units, a compressing means for receiving output data from the source output unit and compressing the data to generate compressed dubbing data, means for generating breakpoint information indicative of a per-program breakpoint of the compressed dubbing data based on specified information indicating a per-program breakpoint of the output data from the source output unit, a first recording unit for receiving the compressed dubbing data and recording the data to a predetermined first recording medium, and a first management information generating means for first management information for managing the operation of read/write from/to the first recording medium in such a manner that the data recorded in the first recording unit are managed per program based on the breakpoint information.

To compress the output data from the source output unit to the recording medium by the recording unit, the dubbing apparatus determines a breakpoint of a program (track) using the specified information indicative of a program breakpoint of the output data from the source output unit, and generates breakpoint information indicative of the program breakpoint of the compressed dubbing data.

The dubbing apparatus according to the present invention, having the above construction, can provide an accurate track management for the data dubbed to the first recording medium based on the specified information indicative of the track breakpoint incidental to the dubbing source data by monitoring the stream of the compressed dubbing data for example without depending upon the detection of any no-sound interval or the like.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 7 explains a U-TOC sector 0 of the MD system.

FIGS. 10A and 10B explain the CD sub code

FIG. 12 explains the CD TOC data.

FIG. 15 shows the directory contents.

BEST MODE FOR CARRYING OUT THE INVENTION

Note that "dubbing" referred to herein will include copy of data from a recording medium as a dubbing source to a recording medium as a dubbing destination as well as data move from a recording medium as a dubbing source to a recording medium as a dubbing destination.

The present invention will be described in the following order:

1. Dubbing apparatus
   1-1 General construction
   1-2 MD drive
   1-3 CD drive
   1-4 HD drive
   1-5 Audio input/output unit
   2. MD track format
   3. U-TOC
   4. Sub code and TOC in CD
   5. HD FAT structure
   6. Dubbing operation—Example 1
   7. Dubbing operation—Example 2

1. Dubbing Apparatus

1-1 General Construction

Figure 1:
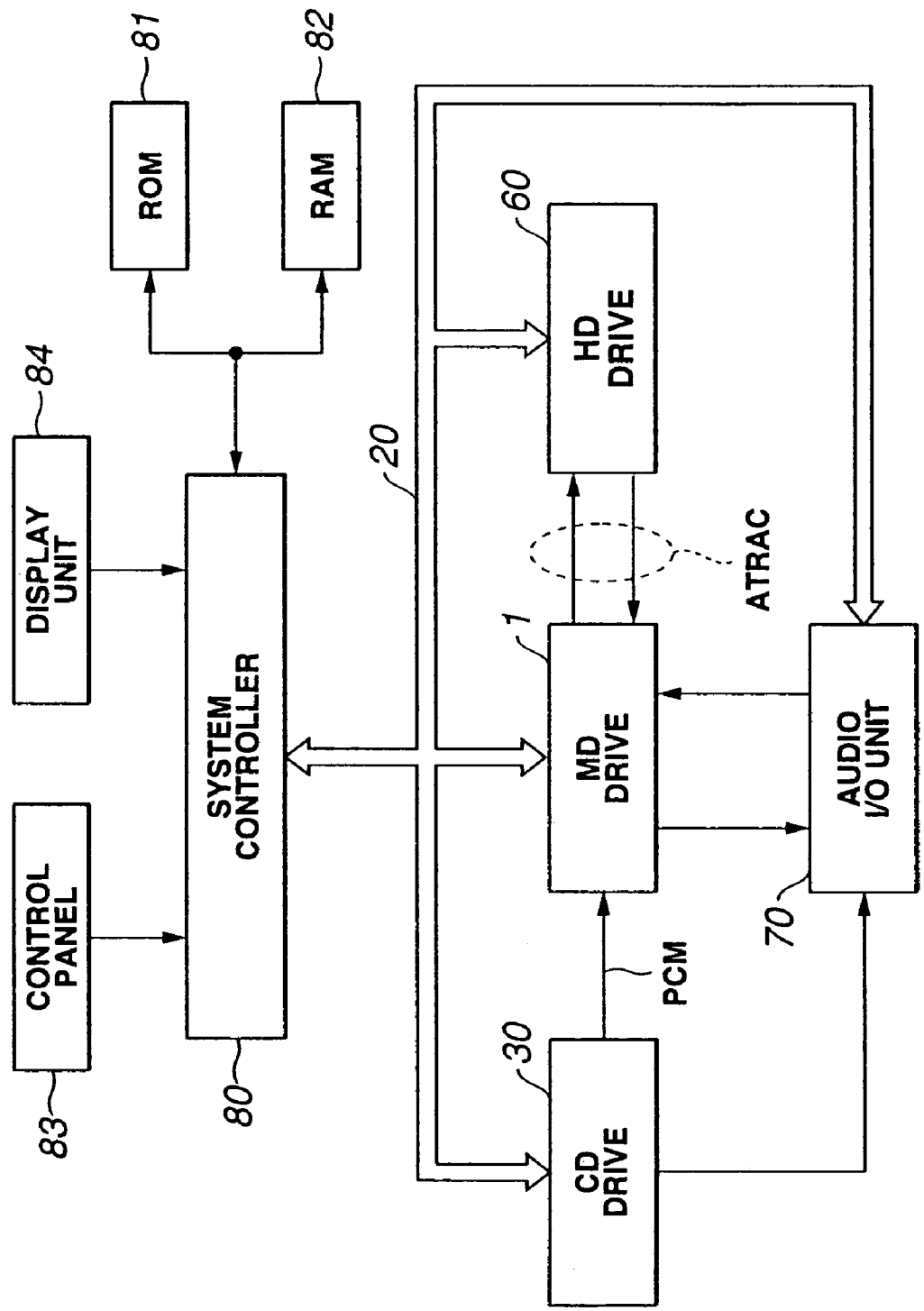
FIG. 1 is a schematic block diagram of the dubbing apparatus according to the present invention.

Referring now to FIG. 1, there is schematically illustrated in the form of a block diagram the dubbing apparatus according to the present invention. The dubbing apparatus is a composite digital audio system including three major parts: CD drive 30 for playback of a CD, MD drive 1 for an MD recording and playing, and HD (hard disc) drive 60.

The CD drive 30 reads a CD loaded therein. It can read digital audio data as a PCM (pulse-code modulation) signal of 44.1 kHz in sampling frequency and having a 16 bit-quantized format. The PCM signal thus read is supplied as a recording source to the MD drive 1 and also to an audio input/output unit 70.

In the MD drive 1, the PCM signal supplied from the CD drive 30 or digital audio data supplied from the audio input/output unit 70 can be compressed by ATRAC (Adaptive Transform Acoustic Coding), and the compressed audio data be recorded to the loaded MD. In the following description, audio data compressed by ATRAC will also be referred to as "ATRAC data".

In this embodiment, compressed audio data is recorded to a hard disc in the HD drive 60 which will be described in detail later in order to use less recording area of the hard disc. This data compression is done using an ATRAC-based audio-compression encoder in the MD drive 1. Therefore, the dubbing apparatus is designed such that ATRAC data compressed in the MD drive 1 can be supplied from the MD drive 1 to the HD drive 60. Thus, no special hardware has to be provided for compression of audio data. However, there may be provided any other type of audio-compression encoder/decoder such as MP3 (MEPG Audio Layer 3) independently of the MD drive 1 if necessary.

The MD drive 1 supplies the audio input/output unit 70 with digital audio data having the PCM signal format, having been decompressed (expanded) by an ATRAC-based audio-compression decoder.

The HD drive 60 is adapted to record the ATRAC data transferred from the MD drive 1 to an internal hard disc for reservation. It is also adapted to read the ATRAC data recorded in the hard disc and transfer it to the MD drive 1.

The audio input/output unit 70 is designed, as will be described in detail later, to output a PCM signal output from the CD drive 30 or MD drive 1 for example as a digital audio signal without modification to outside. It is also adapted to convert an input PCM signal into an analog audio signal and output it.

The audio input/output unit 70 is adapted to receive a digital audio signal input as a PCM signal or ATRAC data and transfer it to the MD drive 1. It is also adapted to covert the input analog audio signal into a digital audio signal and transfer it to the MD drive 1 as above.

Working as a signal path for the above audio data, the dubbing apparatus according to the present invention will make the following dubbing operation.

Supplied with a PCM signal read from the CD by the CD drive 30, the MD drive 1 can make audio compression of the signal and record the data to an MD loaded therein. This is a dubbing from CD to MD. Also, the MD drive 1 can read ATRAC data from the MD and transfer it to the HD drive 60 which will record the ATRAC data to a hard disc provided therein. This is a dubbing from MD to HD.

Receiving, as a digital audio signal, an external digital or analog audio signal supplied to the audio input/output unit 70, the MD drive 1 can make audio compression of the data and record the compressed data to an MD loaded therein.

The MD drive 1 can make audio compression of a PCM signal supplied from the CD drive 30 or digital audio data supplied as a recording signal from the audio input/output unit 70, and transfer ATRAC data as a result of the compression to the HD drive 60 which will record the data to a hard disc provided therein. The user will take this procedure as a dubbing from CD to HD and consider that audio dubbing data has been converted to ATRAC data.

Also, ATRAC data recorded in the HD drive 60 can be read and transferred to the MD drive 1 where it will be recorded to an MD loaded therein. This is a dubbing from HD to MD.

This embodiment of the dubbing apparatus according to the present invention can provide the following four patterns of dubbing among the MD drive 1, CD drive 30 and HD drive 60.

1. Dubbing from CD to MD
2. Dubbing from MD to HD
3. Dubbing from CD to HD
4. Dubbing from HD to MD In the above dubbing pattern (3), a PCM signal read from a CD is passed through the audio-compression encoder in the MD drive 1, so that it will be converted to ATRAC data for dubbing.

Audio data read by the CD drive 30 or MD drive 1 from a CD or MD is supplied to the audio input/output unit 70, and thus it can be outputted as digital audio data or analog audio signal to outside. ATRAC data read by the HD drive 60 from an HD is expanded (decompressed) by the MD drive 1 and supplied to the audio input/output unit 70, and thus it can also be outputted as digital audio data or analog audio signal to outside.

The dubbing apparatus according to the present invention includes also a system controller 80 which is a microcomputer incorporating a CPU, interface and the like. The system controller 80 controls each of the MD drive 1, CD drive 30, HD drive 60 and audio input/output unit 70 to control the operation of the whole dubbing apparatus. The system controller 80 implements this operation control by communicating with a controller provided in each of the MD drive 1, CD drive 30, HD drive 60 and audio input/output unit 70 via a system control bus 20.

The system controller 80 has a ROM 81 and RAM 82. ROM 81 has stored therein data on various programs to be executed by the system controller 80 and a variety of necessary control information. Also, RAM 82 is used by the system controller 80 as a work area for effecting various control processes.

Also, the dubbing apparatus is provided with a control panel or operation unit 83. The control panel 83 has provided thereon various controls to be operated by the user to allow the dubbing apparatus to operate in various manners. An operation made by the user to each of the controls is outputted as a command signal to the system controller 80.

By operating the control panel 83, the user can cause each of the MD drive 1, CD drive 30 and HD drive 60 to operate in various manners for data recording and playback. The control panel 83 can also be operated to effect each of the above-mentioned dubbing operations.

The dubbing apparatus also includes a display unit 84 having a display device such as an LCD display or FL tube to provide a predetermined display corresponding to each operation of the dubbing apparatus.

The appearance of the dubbing apparatus according to the present invention is not illustrated. The dubbing apparatus has an operator's panel on which the control panel 83 with various controls and the display unit 84 are provided in place.

The MD drive 1 has an MD slot for loading and unloading MD, and the CD drive 30 has a CD slot for loading and unloading a CD. The audio input/output unit 70 has various input/output terminals which will be described in detail later. Jacks and connectors as the input/output terminals are provided exposed in place on the enclosure of the dubbing apparatus.

1-2 MD Drive

Figure 2:
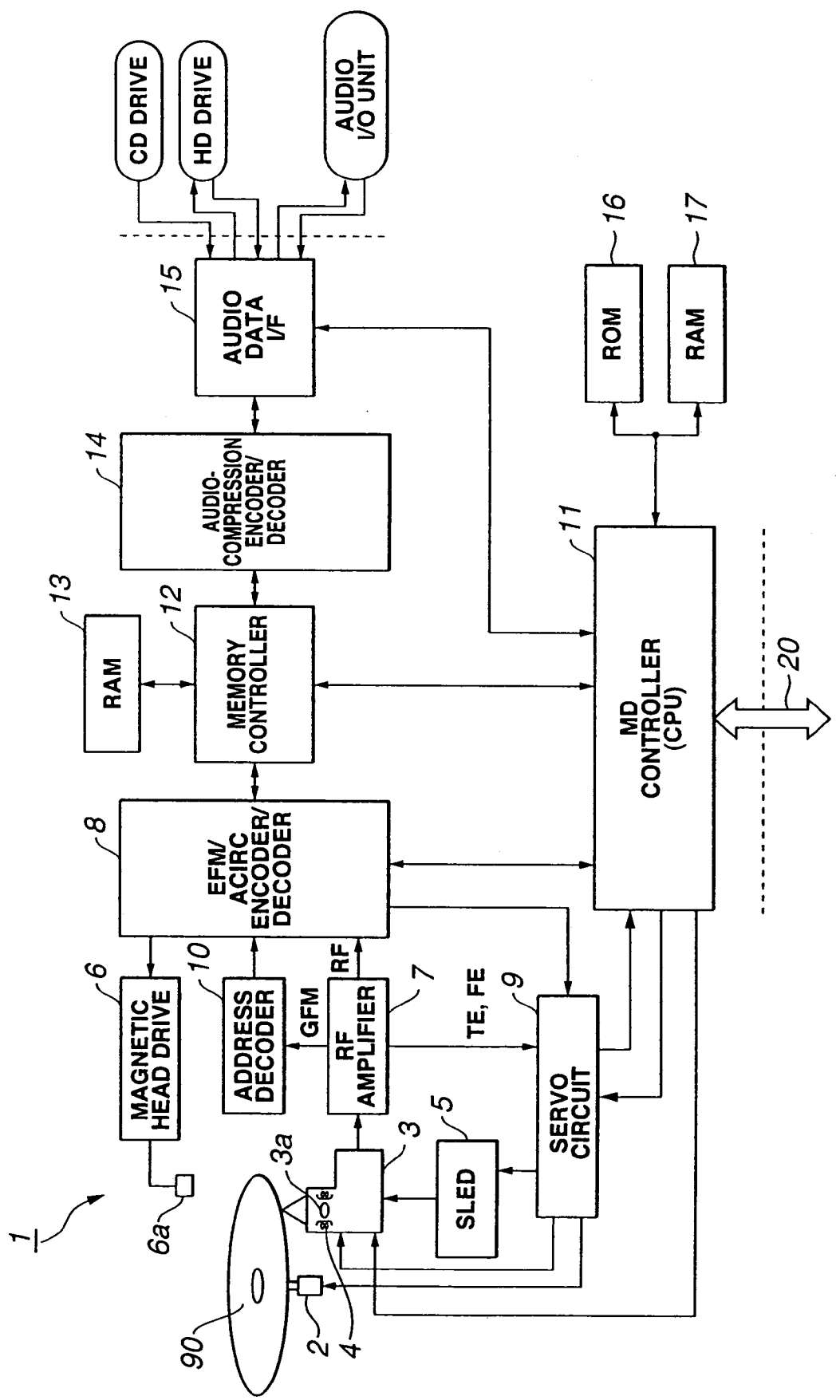
FIG. 2 is a block diagram of an MD drive included in the dubbing apparatus according to the present invention.

The internal construction of the MD drive 1 will be described below with reference to the block diagram in FIG. 2:

The MD drive 1 operates with an MD 90 which is a magneto-optical disc to and from which audio data compressed by ATRAC can be written and read. The MD 90 is rotated by a spindle motor 2. The MD 90 is illuminated with a laser light from an optical head 3 for data write or read thereto or therefrom.

The optical head 3 emits a high-power laser light for heating the recording track on the MD 90 up to a Curie point for writing data to the MD 90, and emits a relatively low-power laser light for detecting, under the magnetic Kerr effect, data from a return light for reading data from the MD 90.

To this end, the optical head 3 is composed of a laser diode as a laser source, an optical system including a polarizing beam splitter (PBS), objective lens 3a, etc., photodetector to detect a return light, etc. The objective lens 3a is supported by a biaxial mechanism 4 to be movable radially of the MD 90 and toward and away from the MD 90.

Also, a magnetic head 6a is provided in a position opposite to the optical head 3 and where the MD 90, when loaded, will be interposed between the head 6a and head 3. The magnetic head 6a applies the MD 90 with a magnetic field modulated by supplied data.

The entire optical head 3 and magnetic head 6a are movable by a sled mechanism 5 radially of the MD 90.

With the MD drive 1 in operation for data reading, information detected by the optical head 3 from the MD 90 is supplied to an RF amplifier 7. This RF amplifier 7 computes the supplied information to extract a read RF signal, tracking error signal TE, focus error signal FE, groove information (absolute position information recorded as wobbled groove on the MD 90) GFM, etc.

The extracted read RF signal is supplied to an EFM/ACIRC encoder/decoder 8, the tracking error signal TE and focus error signal FE are supplied to a servo circuit 9, and the groove information GFM is supplied to an address decoder 10.

The servo circuit 9 generates various servo drive signals based on the tracking error signal TE and focus error signal FE supplied from the RF amplifier 7, a track jump command and access command supplied from a microcomputer-based system controller 11 for the MD drive 1 (will be referred to as "MD controller" hereunder), and information on a detected rotation speed of the spindle motor 2, etc. The servo drive signals are used to control the biaxial mechanism 4 and sled mechanism 5 for control of focusing and tracking while controlling the spindle motor 2 to a constant linear velocity (CLV).

The address decoder 10 decodes the supplied groove information GFM to extract address information which will be supplied to the MD controller 11 for use to effect various control operations.

The read RF signal undergoes decoding processes such as EFM demodulation, CIRC (cross interleaved Reed-Solomon Code), etc. in the EFM/ACIRC encoder/decoder 8. At this time, address, sub-code data, etc. are also extracted and supplied to the MD controller 11.

Audio data (sector data) having undergone decoding processes such as EFM demodulation, CIRC, etc. in the EFM/ACIRC encoder/decoder 8 is written once by a memory controller 12 into a buffer memory 13. It should be noted that data read by the optical head 3 from the MD 90 and transfer of read data in a system from the optical head 3 to buffer memory 13 are effected at a rate of 1.41 Mbits/sec and intermittently in the normal cases.

Data written into the buffer memory 13 is read at such a timing that read data is transferred at a rate of 0.3 Mbit/sec, and supplied to an audio-compression encoder/decoder 14 where it will be expanded (decompressed) oppositely to the ATRAC-based audio-compression having been applied thereto to provide a 16 bit-quantized digital audio signal of 44.1 kHz in sampling frequency. Namely, the data is converted to a PCM signal.

According to this embodiment of the dubbing embodiment, the PCM signal is transferred to an audio data interface 15 from which it can further be transferred to the audio input/output unit 70 according to a command from the MD controller 11.

Also in the embodiment, the read data transferred from the memory controller 12, that is, ATRAC data, may be transferred, without being changed from the ATRAC data format, to the audio data interface 15 without being decompressed (expanded) in the audio-compression encoder/decoder 14 oppositely to the audio compression having been applied thereto. By transferring the ATRAC data having thus been transferred to the audio data interface 15 as recording data to the HD drive 60, there will be attained an MD-to-HD data dubbing to dub the ATRAC data to a hard disc (HD) 63 in the HD drive 60.

For data write to the MD 90, operations will be done as follows:

In this case, the record source is an ATRAC data read by the HD drive 60 from the HD 90 or digital audio data acquired via the audio input/output unit 70 and having the PCM signal format. The data as record source is supplied to the audio data interface 15 and transferred to the audio-compression encoder/decoder 14.

In case the record data having been transferred as above is ATRAC data, it will be transferred to the memory controller 12 without undergoing any audio compression in the audio-compression encoder/decoder 14. On the contrary, in case the record data is digital audio data having the PCM signal format, it will undergo the ATRAC-based audio compression to have the ATRAC format, and then be transferred to the memory controller 12.

The memory controller 12 will write the thus transferred ATRAC data once into the buffer memory 13 where it will be accumulated, and then the ATRAC data will be read un units of a predetermined amount of data and transferred to the EFM/ACIRC encoder/decoder 8.

In the encoder/decoder 8, the supplied data undergoes encoding processes such as CIRC encoding, EFM modulation, etc., and then supplied to a magnetic head drive circuit 6.

According to the encoded record data, the magnetic head drive circuit 6 supplies a magnetic head drive signal to a magnetic head 6a. That is, the magnetic head drive signal will cause the magnetic head 6a to apply a magnetic field of N or S polarity to the MD 90. At this time, the MD controller 11 will supply the optical head with a control signal to emit a recording-level laser light.

Note that as well known, the MD drive is adapted to make program editing such as track (program) division, track connection, track erasure, track name entry, disc name entry, etc. According to this embodiment, the user can select these program-editing operations by operating corresponding controls on the control panel 83 shown in FIG. 1.

The MD controller (system controller for MD) 11 is a microcomputer with a CPU, internal interface, etc. to control various operations of the MD drive 1. The MD controller 11 is adapted such that by communicating with the system controller 80 of the dubbing apparatus via the system control bus 20, it can control predetermined operations of the MD drive 1 under the control of the system controller 80. When the user operates the control panel 83 to instruct the MD drive 1 for a certain operation such as data write or read, editing or the like, the system controller 80 will send a command for such an operation to the MD controller 11. Thus, the MD controller 11 will provide a corresponding operation control according to the command received from the system controller 11 for the MD drive 1 to attain the user-defined operation.

The MD drive 1 includes a ROM 16 having stored therein programs and the like for implementation of various operations of the MD drive 1 and a RAM 17 which appropriately holds necessary data and programs for the MD controller 11 to execute various processes.

For data write or read to or from the MD 90, it is necessary to read management information recorded in the MD 90, that is, P-TOC (pre-mastered TOC) and U-TOC (user TOC). According to the management information, the MD controller 11 determines the address of an area on the MD 90, to which data is to be written, and the address of an area from which data is to be read. The management information is held in the buffer memory 13.

By controlling the MD drive 1 to read the management information from the innermost circumferential area (lead-in area) of the MD 90 when loaded in the MD drive 1, the MD controller 11 will acquire the management information and store the data in the buffer memory 13. The MD controller 11 can thus refer to the data for subsequent write or read of a program to or from the MD90, or for editing a program.

A U-TOC is to be rewritten correspondingly to recording of program data or each editing process. At each recording or editing, the MD controller 11 updates the U-TOC information stored in the buffer memory 13, and also rewrites the U-TOC area in the MD 90 at a predetermined timing and correspondingly to the rewriting operation.

1-3 CD Drive

Figure 3:
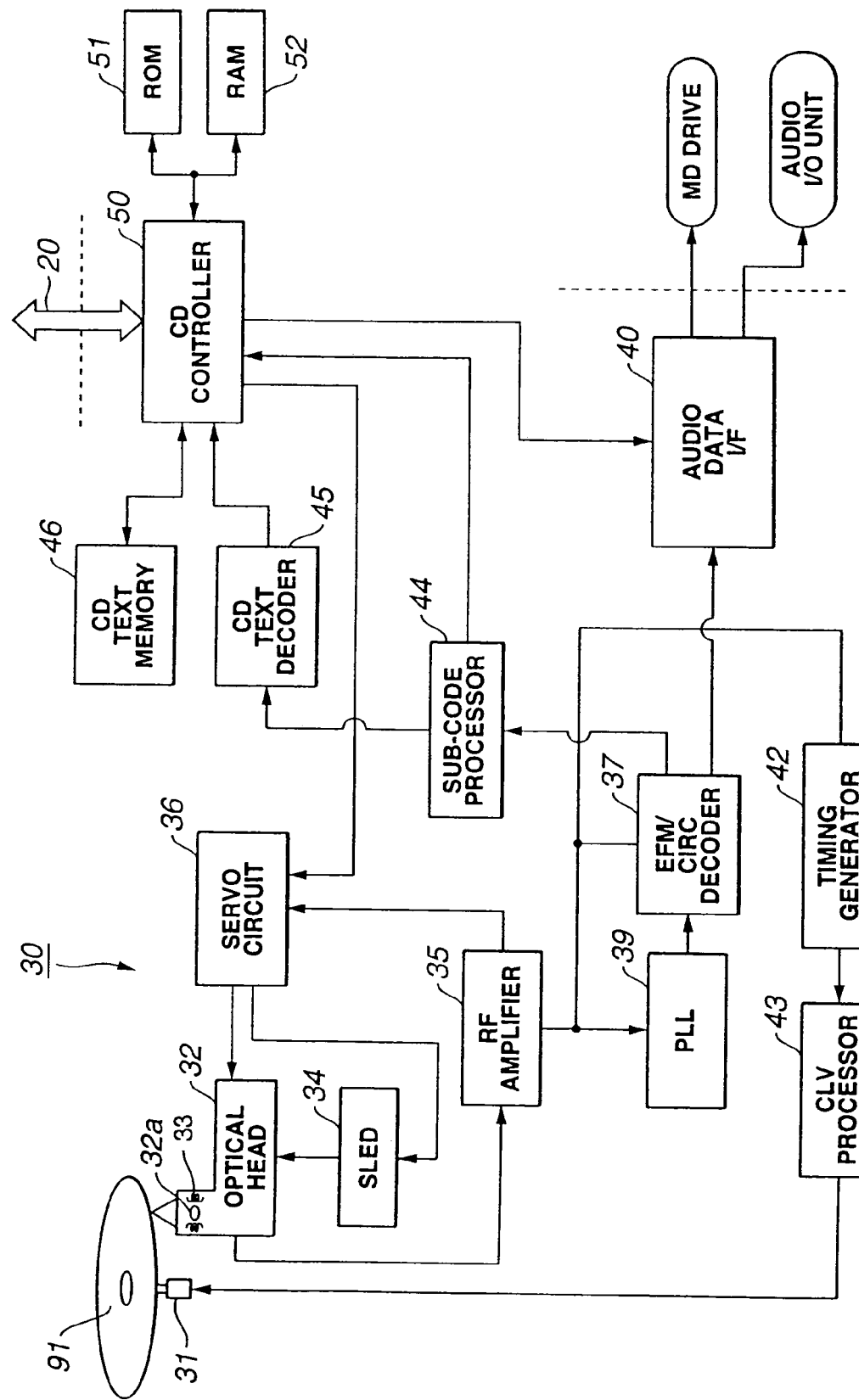
FIG. 3 is a block diagram of a CD drive included in the dubbing apparatus according to the present invention.

Next, the internal construction of the CD drive 30 will be described below with reference to the block diagram in FIG. 3:

As well known, a CD (compact disc) 91 is a read-only disc medium. It is loaded into place for reading in the CD drive 30.

The CD 91 loaded in place for reading is rotated by a spindle motor 31 at a constant linear velocity (CLV) during an operation for CD reading. An optical head 32 reads data recorded in the form of pits on the CD 91, and supplies the data to an RF amplifier 35. In the optical head 32, an objective lens 32a is supported by a biaxial mechanism 33 to be movable in tracking and focusing directions. The optical head 32 is moved by a sled mechanism 34 radially of the CD 91.

The RF amplifier 35 generates a focus error signal and tracking error signal in addition to a read RF signal, and supplies the error signals to a servo circuit 36.

The servo circuit 36 generates various drive signals such as focus drive signal, tracking drive signal, sled drive signal, etc. from the focus error signal and tracking error signal to control the operations of the biaxial mechanism 33 and sled mechanism 34. That is, the servo circuit 36 provides focus servo control and tracking servo control.

In this case, the RF amplifier 35 will also binarize the read RF signal to provide an EFM signal. The EFM signal is also outputted to a timing generator 42 where a timing signal is generated based on a waveform timing of the read RF signal. The timing signal is outputted to a CLV processor 43 where the input timing signal is used as a base to generate a drive signal to drive the spindle motor 31 at the predetermined CLV. The drive signal is supplied to the spindle motor 31. Thus, a spindle servo control is effected to drive the CD 91 at CLV.

The EFM signal is supplied to a EFM/CIRC decoder 37 where it will undergo EFM demodulation, CIRC decoding, etc. to decode information having been read from the CD 91 to audio data of 44.1 kHz in sampling frequency and having a 16 bit-quantized format. That is, the decoder 37 provides a PCM signal.

The EFM/CIRC decoder 37 is designed to extract also control data such as sub code etc. A data part as the sub code is supplied to a sub-code processor 44 where it will be arranged to be appropriate data as a sub code. Particularly, there is also extracted TOC (table of contents) information recorded as sub Q data of a sub code recorded in the lead-in area of the CD 91. These sub-code data and TOC are supplied to a CD controller 50 where they will be used for a variety of control operations. The CD controller 50 executes a variety of control processes for predetermined operations of the CD drive 30.

The EFM signal resulted from binarization of the read RF signal in the RF amplifier 35 is also supplied to a PLL circuit 39.

The PLL circuit 39 provides a clock synchronous with the channel bit of the supplied EFM signal. The clock has a frequency of 4.3218 MHz at a normal velocity. The clock is used as a clock for a signal processing circuitry downstream of the EFM/CIRC decoder 37 for example.

In this case, a PCM signal being digital audio data output from the decoder 37 is transferred to an audio data interface 40. In this audio data interface 40, PCM signal input to the audio input/output unit 70 and MD drive 1 is transferred under the control of the CD controller 50.

For data read from the CD 91, it is necessary to read management information recorded in the CD 91, that is, a TOC. According to the management information, the CD controller 50 determines a number of tracks in the CD 91, address of each track, etc. to control the reading operations. For this purpose, the CD controller 50 controls the optical head 32 to read the innermost circumferential area (lead-in area) of the CD 91, where the TOC is recorded, when the CD 91 is loaded in place in the CD drive 30, to read the TOC, and extracts TOC information as above. The TOC is stored in a RAM 52 for example for reference at subsequent reading of the CD 91.

The CD controller 50 is a microcomputer with a CPU, internal interface, etc. to control the above-mentioned various operations.

The CD drive 30 has also a ROM 51 having stored therein programs etc. for implementing various operations of the CD drive 30, and the RAM 52 appropriately holds necessary data and programs for the CD controller 50 to executed various processes.

As well known, the CD standard defines that text data can be inserted as a sub code and used a disc title, track name or the like for example.

The CD drive 30 included in the embodiment of the dubbing apparatus is adapted to read the CD text data. To this end, the CD drive 30 is provided with a CD text decoder 45 and CD text memory 46.

For example, the sub-code data provided from the sub-code processor 44 is also supplied to the CD text decoder 45 where the sub-code data is decoded to provide a text data in case the input sub-code data has a CD text data inserted therein. The text data thus provided is stored into the CD text memory 46 under the control of the CD controller 50.

Thereafter, the CD controller 50 reads a text data from the CD text memory 46 as necessary, and transfers it to the system controller 80 of the debugging apparatus via the system control bus 20. In the system controller 80, the text data is processed to be displayed as characters on the display unit 84.

1-4 HD Drive

Figure 4:
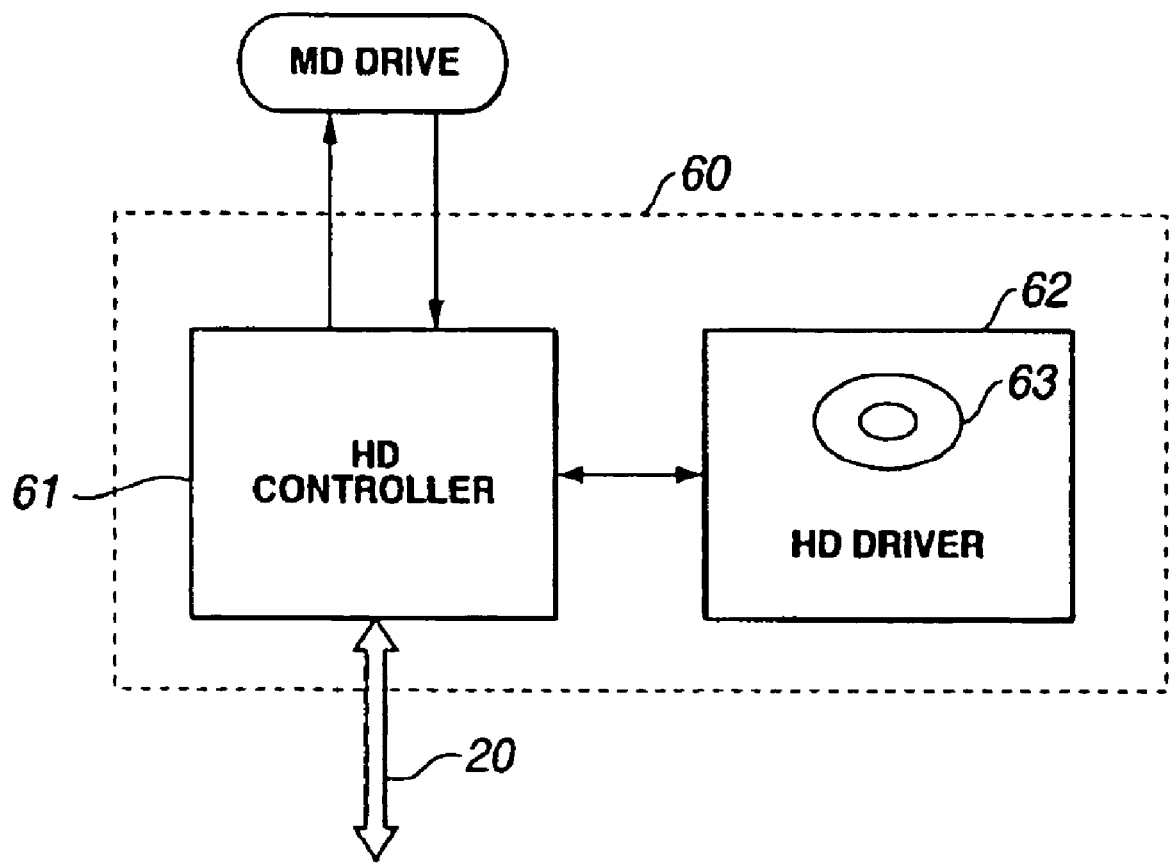
FIG. 4 is a block diagram of an HD drive included in the dubbing apparatus according to the present invention.

The internal construction of the HD drive 60 will be described below with reference to FIG. 4. As shown, the HD drive 60 includes an HD controller 61 and HD driver 62.

The HD controller 61 controls data write and read to and from a hard disc (HD) 63 provided in the HD driver 62, and also controls transfer of ATRAC data between the HD drive 60 and the audio data interface 15 of the MD drive 1.

For recording data for example, the HD controller 61 is supplied with audio data transferred from the audio data interface 15 of the MD drive 1, and transfers it to the HD driver 62. The HD controller 61 will control the HD driver 62 for the thus transferred ATRAC data to be written to a predetermined area on the HD 63 provided in the HD driver 62.

For reading data, the HD controller 61 designates an address on the HD 63 in the HD driver 62 and controls the HD driver 62 to read ATRAC data from that address on the HD 63. The HD driver 62 acquires the ATRAC data read from the HD 63, and transfers it to the audio data interface 15 of the MD drive 1.

The hard disc in the HD drive 60 is managed by a file system having FAT (file allocation table) whose construction will be described in detail later.

1-5 Audio Input/Output Unit

Figure 5:
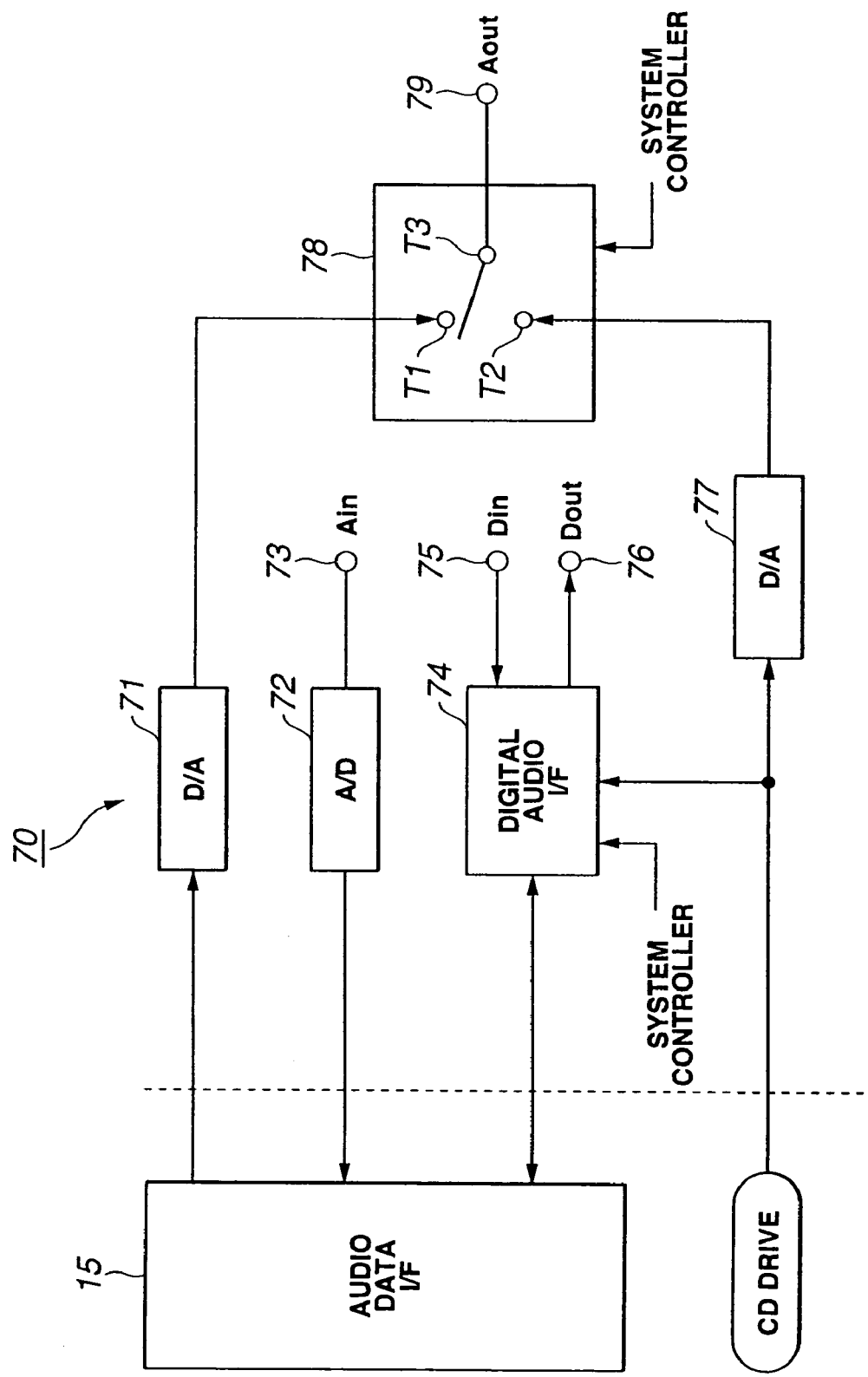
FIG. 5 is a block diagram of an audio input/output unit included in the dubbing apparatus according to the present invention.

The audio input/output 70 will be described below with reference to the block diagram in FIG. 5. In the audio input/output unit 70, when a PCM signal resulted from expansion (decompression) of ATRAC signal for example is outputted from the audio data interface 15 of the MD drive 1, it is converted by a D/A converter 71 into an analog signal, and this analog signal is outputted to a terminal T1 of a switch 78.

The PCM signal outputted from the audio data interface 15 of the MD drive 1 can also be supplied to a digital audio interface 74. From the digital audio interface 74, the supplied PCM signal is outputted from a digital audio output terminal 76.

The PCM signal transferred from the audio data interface 40 of the CD drive 30, that is, read data from the CD, is supplied to the digital audio interface 74 and D/A converter 77.

Also in this case, the PCM signal supplied to the digital audio interface 74 is outputted from the digital audio output terminal 76.

The PCM signal supplied to the D/A converter 77 is converted into an analog audio signal, and this signal is outputted to a terminal T2 of the switch 78.

The switch 78 has also a terminal T3 which is selectively connected to either the terminal T1 or T2. This switching is done under the control of the system controller 80. The terminal T3 is connected to an analog audio output terminal 79.

When the terminal T3 is connected to the terminal T1, the PCM signal outputted from the MD drive 1 will be outputted finally as an analog audio signal from the analog audio output terminal 79. On the other hand, when the terminal T3 is connected to the terminal T2, the PCM signal outputted from the CD drive 30 will be outputted as an analog audio signal from the analog audio output terminal 79.

An analog audio signal supplied from outside via an analog audio input terminal 73 is converted in an A/D converter 72 into a digital audio signal having a PCM signal format, and outputted to the digital audio interface 15 of the MD drive 1.

Digital audio data in the PCM signal format, supplied from outside via a digital audio input terminal 75 is supplied to the digital audio interface 74, and then from the interface 74 to the digital audio interface 15.

As above, the PCM signal supplied to the digital audio interface 15 is compressed in the MD drive 1 for example to be ATRAC data which can be recorded to an MD in the MD drive 1. Also, the data may be compressed in the MD drive 1 and transferred to the HD drive 60 where it can be recorded to the HD 63.

2. MD Track Format

A cluster format of the data recording track of a mini disc (MD) 90 which is a magneto-optical disc, will be described herebelow:

In the mini disc (MD) system, operations for data recording in the mini disc (MD) are effected in units of a cluster. The format of cluster is shown in FIG. 6.

Figure 6:
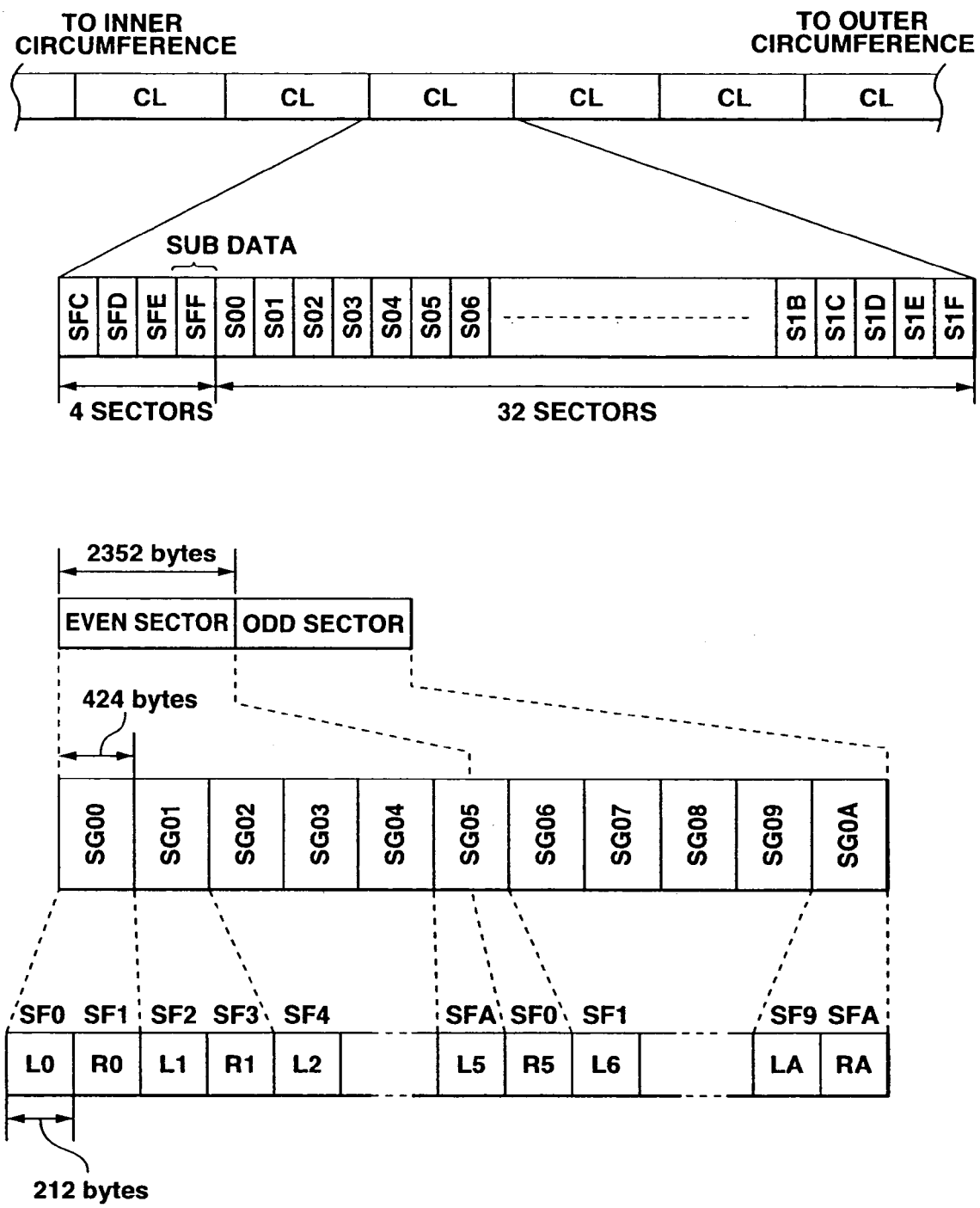
FIG. 6 explains a cluster format of a mini disc (MD) system.

As shown in FIG. 6, clusters CL are contiguously formed along a recording track in the MD system. One cluster is a minimum unit for data recording. One cluster is equivalent to two to three rounds of track.

As shown also in FIG. 6, one cluster CL is formed from a sub data area having four sectors SFC to SFF, and a main data area having 32 sectors S00 to S1F. The main data is data having been compressed by ATRAC when it is audio data.

One sector is a data unit of 2352 bytes in size.

The sub data area including the four sectors is used to hold sub data or as a linking area, and the main data area of 32 sectors is to record TOC data, audio data, etc. The linking area sectors are provided to justify a gap caused by the fact that the interleave length of CIRC adopted in the present invention is larger than the length of one sector (13.3 msec) adopted in CD etc. for the error correction. The linking area sectors are basically used as a reserved area but they may be used to record some processes or some control data.

Note that an address is recorded at each sector.

The sector is sub-divided into units called "sound group". Two sectors are divided into eleven sound groups. As shown in FIG. 6, two contiguous sectors including an even sector S00 and an odd sector S01, for example, include sound groups SG00 to SG0A. One sound group is of 424 bytes and can record an amount of audio data equivalent to a time of 11.61 msec.

One sound group SG records data shared between L and R channels. For example, a sound group SG00 includes L-channel data L0 and R-channel data R0, an a sound group/SG01 includes L-channel data L1 and R-channel data R1.

Note that the L- or R-channel data area of 212 bytes is called "sound frame".

3. U-TOC

The cluster format as shown in FIG. 6 is formed over the entire magneto-optical disc (MD) 90. An innermost circumferential area (lead-in area) as a radially divided area is used as a management area and a program area is formed following the management area.

At the innermost circumferential side of the disc, there is provided a read-only area where read-only data is recorded as phase pits, and a magneto-optical area to which data can be recorded magneto-optically is formed following the read-only area. The management area includes the read-only area and innermost circumferential portion of the magneto-optical area.

The program area is formed following the management area in the magneto-optical area. In the program area, there is recorded in each sector as a main data area (also called "recordable user area").

On the other hand, in the read-only area, there is provided a P-TOC (pre-mastered TOC) as a management area to manage the area of the entire disc, and in a management area in the magneto-optical area following the P-TOC, there is recorded TOC information (U-TOC: so-called user table of contents) to manage each program (piece of music or the like) recorded in the program area.

The U-TOC sectors as management information to manage the operations for write/read of a track (music piece or the like) on the MD 90, will be described herebelow with reference to FIG. 7:

FIG. 7 shows the format of a U-TOC sector 0.

Note that the U-TOC sectors can include sectors 0 to 31. That is, the sectors S00 to S1F included in one cluster in the management area can be used as U-TOC sectors. Of them, sectors 1 and 4 are used to record a text and the sector 2 is used to record a date and time of recording.

The U-TOC sector 0 is a data area to record management information as to a free area in which only a piece of music the user has recorded and a new piece of music can be recorded. That is to say, the sector 0 is to manage the start address and end address of each program recorded in the program area, copy protect information and emphasis information as track modes of each program, etc.

For example, to write a piece of music to the MD 90, the MD controller 11 will search the U-TOC sector 0 for a free area and make a procedure for writing audio data to the free area. Also, for reading a piece of music, the MD controller 11 will determine, from the U-TOC sector 0, an area where the music piece is recorded, and make a procedure for accessing that area and reading the piece of music from the area.

As shown in FIG. 7, the U-TOC sector 0 has recorded therein, after a header H in which a sync pattern is formed with 12 bytes, a 3-byte data ("Cluster H", "Cluster L" and "SECTOR") as the address of that sector, maker code and model code, indicating the manufacturer of the disc, first program number ("Fist TNO"), last program number ("Last TNO"), sector availability ("used sectors"), disc serial number ("disc serial No"), disc ID, etc.

Further, the U-TOC sector 0 has recorded therein a correspondence table indicative data T including a pointer P-DFA (pointer for detective area) indicating the top position of a slot in which there is stored information on the position of a defect caused on the disc, a pointer P-EMPTY (pointer for empty slot) indicating the availability of the slot, a pointer P-FRA (pointer for free area) indicating the top position of a slot in which the recordable area is managed, and pointers P-TNO1, P-TNO2, . . . , P-TNO255 each indicating the top position of a slot corresponding to each program number.

Following the correspondence table indicative data T, there are provided management tables C and T in which 255 slots each of 8 bytes are provided. In each slot, there are managed a start address, end address, track mode and link information.

The magneto-optical disc (MD) 90 used in this embodiment may not always record data in a contiguous form therein but may record a sequential data row in a discrete form (as multiple parts). It should be noted that the "part" refers herein to a part of time-contiguous data, which is recorded in physically contiguous clusters.

That is, since the recorder/player (MD drive 1 in FIG. 1) compatible with the disc (MD 90) is adapted to accumulate data once in the buffer memory 13 as having previously been described and change the rates of data write to and data read from the buffer memory 13, it is possible to allow the optical head 3 to access the data discretely recorded in the MD 90 one after another, thereby accumulating the data in the buffer memory 13. Thus, in the buffer memory 13, the data can be reproduced by restoration to the sequential data row.

The above adaptation of the recorder/player will not interfere with any continuous audio reproduction since for data reproduction, the rate of write to the buffer memory 13 is changed to be higher than the rate of read from the buffer memory 13.

Even when a program shorter than an already recorded one is written over the existing program, the disc capacity can be used efficiently by specifying an excess portion of the existing program as a recordable area (area managed by the pointer P-FRA), not erasing the excess portion.

Figure 8:
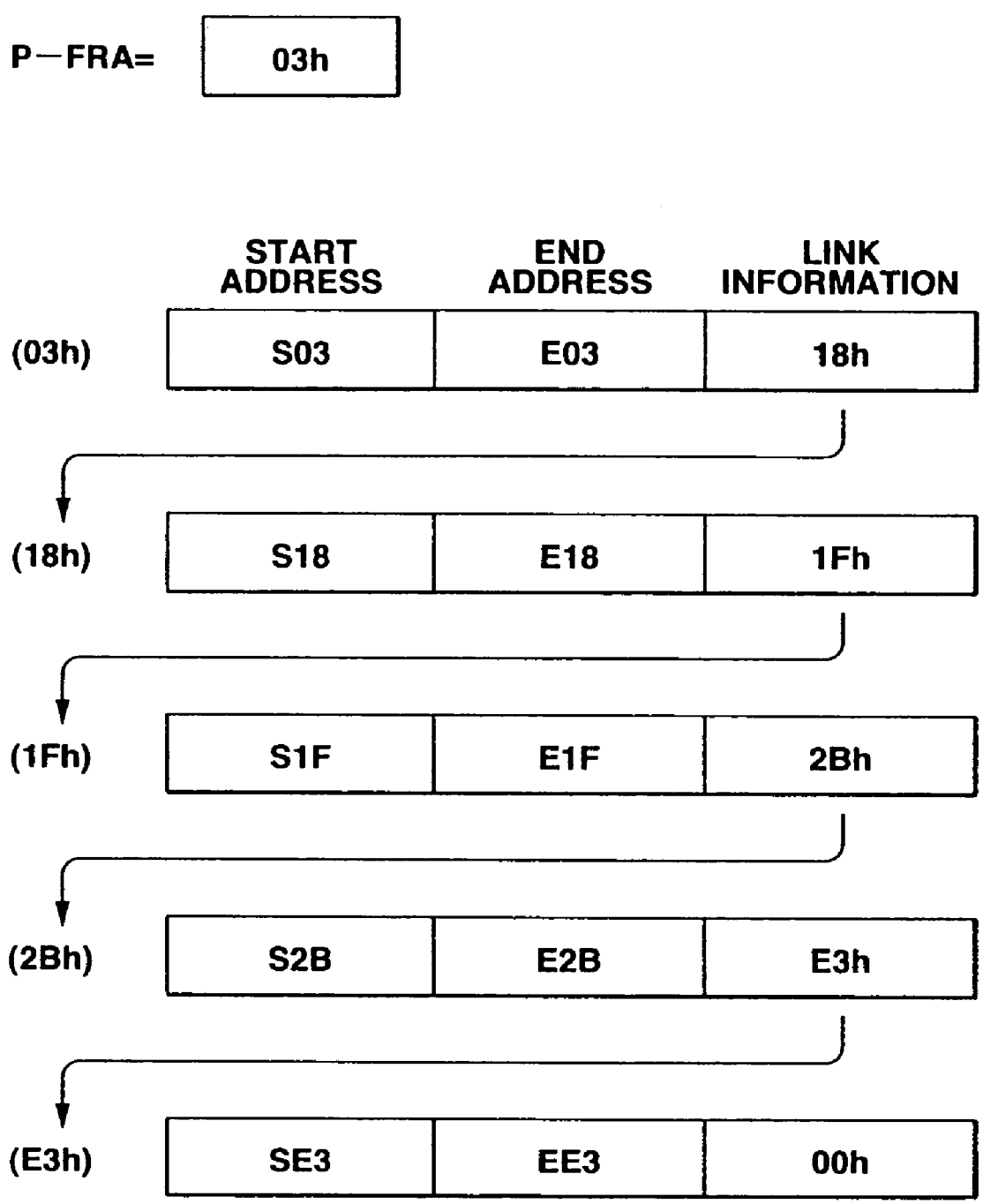
FIG. 8 explains the linkage of the U-TOC sector 0 of the MD system.

How to link discrete areas together will be described with reference to FIG. 8, concerning the pointer P-FRA managing the recordable area.

Assume for example that for example a value 03h (hexadecimal) is recorded at the pointer P-FRA indicating the top position of a slot managing the recordable area. In this case, a slot corresponding to "03h" will be accessed. That os, data at a slot "03h" in the management table will be read.

A start address and end address recorded in the slot "03h" indicate those, respectively, of a part recorded in the disc.

Link information recorded in the slot "03h" indicates the address of a next slot. In this case, "18h" is recorded in the slot.

The link information recorded in the slot "18h" is traced to access a next slot "2Bh" and detect the starting and end addresses of one part in the disc as a start and end addresses recorded in the slot "2Bh".

Similarly, the link information is traced until data "00h" as link information is arrived at, to detect addresses of all parts managed by the pointer P-FRA.

As above, the slots are traced starting with a slot designed with the pointer P-FRA until the link information is null (=00h) and parts discretely recorded in the disc can be linked together in the memory. In this case, all parts can be detected as recordable areas in the disc (MD) 90.

In the foregoing, the linkage of discrete areas has been described concerning the pointer P-FRA. However, it is of course possible to use each of the pointers P-DFA, P-EMPTY, PTNO1, P-TNO2, . . . , P-TNO255 for linking the discrete parts together in the similar manner.

4. Sub Code and TOC in CD

Next, a TOC and sub code recorded to the CD 91 will be described.

A TOC is recorded in the so-called lead-in area, and a sub code is inserted into data as will be described in detail later.

The minimum unit of data recorded in a CD-type disc is one frame, and 98 frames form together one block.

Figure 9:
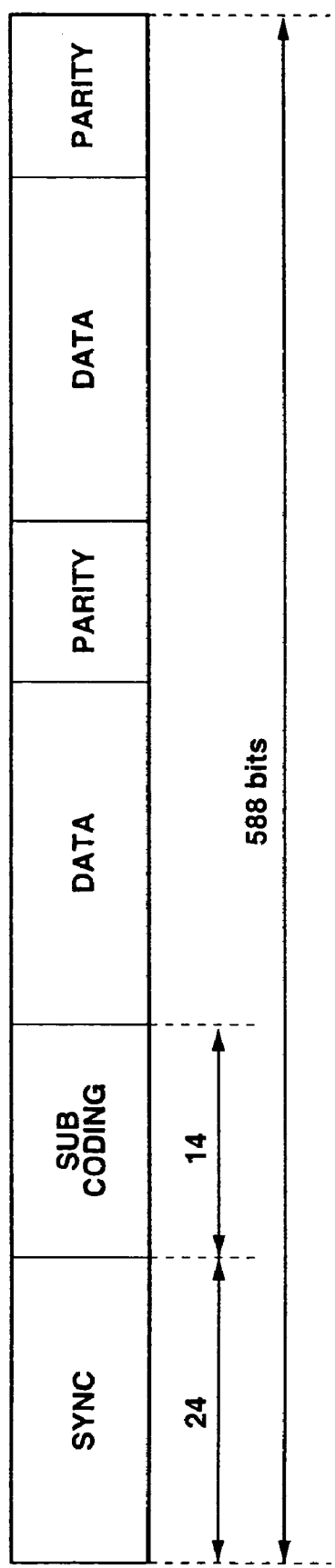
FIG. 9 explains the frame structure of a CD.

The structure of one frame is as shown in FIG. 9.

One frame is composed of 588 bits of which the top 24 bits form sync data and next 14 bits form a sub code data area, and the sub code data area is followed by data and parity.

Ninety eight frames each constructed as above form together one block including sub code data formed from a collection of sub code data extracted from the 98 frames as shown in FIG. 10A.

The sub code data from the first and second frames 98n+1 and 98n+2 of the 98 frames are sync patterns, respectively. The third to 98th frames 98n+3 to 98n+98 form channel data each of 96 bits, namely, sub code data of channels P, Q, R, S, T, U, V and W.

Of the above channels, channels P and Q are used for management of access etc. However, the channel P indicates only a pause between tracks, and thus the channel Q (Q1 to Q96) are used to make more delicate control. The sub Q code of 96 bits is constructed as shown in FIG. 10B.

First, the four bits Q1 to Q4 are control data used to determine a number of channels of audio data in consideration, whether emphasis has been applied to the audio data, whether the disc is a CD-ROM, whether the audio data is authorized to be digitally copied, etc.

Next four bits Q5 to Q8 are address data to indicate the contents of a control bit of the sub Q data.

Further bits Q9 to Q80 are sub Q data of 72 bits, and remaining Q81 to Q96 are CRC data.

Sub Q data recorded in the lead-in area is TOC information, That is, of the sub Q data read in from the lead-in area, the sub Q data of 72 bits Q9 to A80 include information as shown in FIG. 1A. The sub Q data include data each of 8 bits.

First, a track number is recorded to the lead-in area. The track number of fixed at "00" in the lead-in area.

Next, POINT is recorded, and there are additionally recorded MIN (minutes), SEC (seconds) and FRAME (frame number) as an elapsed time in the track.

Further, PMIN, PSEC and PFRAME are recorded. Their meanings depend upon the value of POINT.

The value of POINT being any of "01" to "99" means a track number. In this case, a start point (absolute time address) of a track having the track number assigned thereto is recorded as minutes, seconds and frame number in PMIN, PSEC and PFRAME, respectively.

When the POINT value is "A0", the track number of a first track is recorded in PMIN. It is determined based on the PSEC value which the disc is, CD-DA (CD-digital audio), CD-I or CD-ROM (of XA specification).

When the POINT value is "A1", the track number of a last track is recorded in PMIN.

When the POINT value is "A2", the start point of the lead-out area is recorded as an absolute time address in PMIN, PSEC and PFRAME.

For example, in the case of a disc having data recorded along six tracks, data is recorded as a TOC based on such sub Q data as shown in FIG. 12.

As shown in FIG. 12, the track numbers TNO are all "00".

The block No. indicates a number for one unit of sub Q data read in as block data consisting of 98 frames as having previously been described.

Each TOC data has the same contents written over three blocks.

As shown in FIG. 12, when the POINT value is any of "01" to "06", start points of the tracks #1 to #6 are recorded as PMIN, PSEC and PFRAME.

When the POINT value is "A0", "01" is recorded as the first track number in PMIN. Also, a disc is discriminated based on the PSEC value. When the disc is an ordinary audio CD, the PSEC value is "00". It should be noted that such a definition is made that when the disc is a CD-ROM (of XA specification), the PSEC value should be "20" and when the disc is a CD-I, the PSEC value should be "10".

Also, when the POINT value is "A1", the track number for the last track is recorded in PMIN. When the POINT value is "A2", the start point of the lead-out area is recorded in PMIN, PSEC and PFRAME.

The block n+27 and subsequent blocks have the contents of blocks n to n+26 repeatedly recorded therein.

Figure 11A:
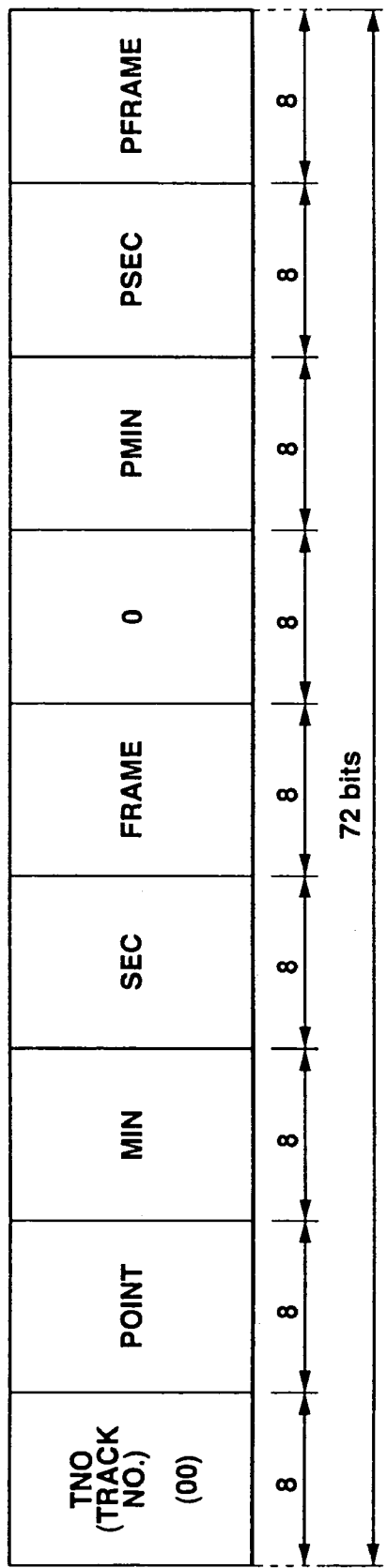
FIGS. 11A and 11B explain the CD TOC and sub code.
Figure 11B:
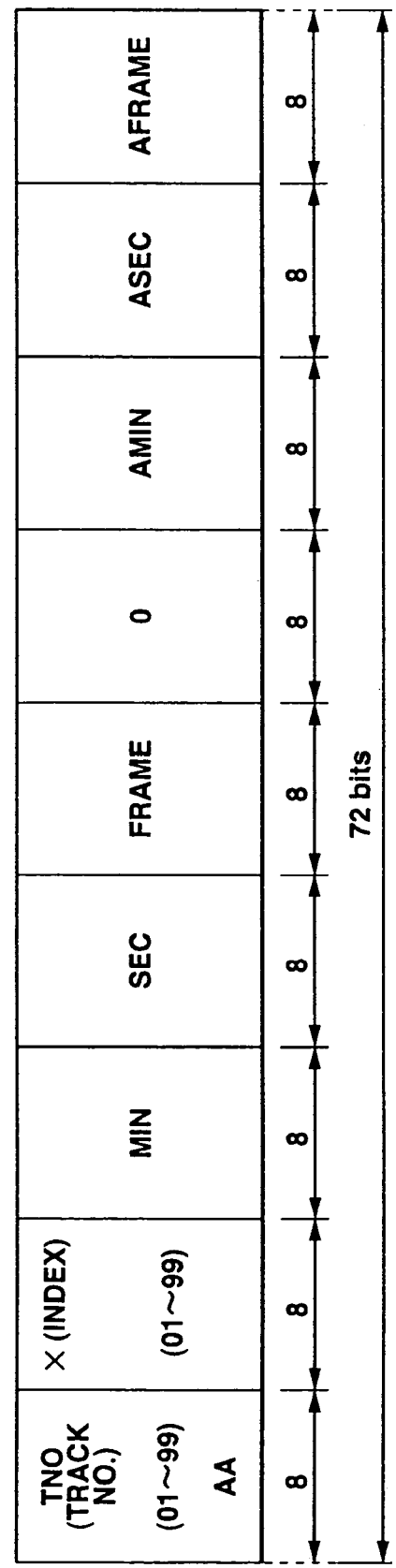

Also, in a program area and lead-out area as tracks #1 to #n having a piece of music or the like recorded therein, sub Q data recorded therein include information as shown in FIG. 11B.

First, a track number is recorded. That is, each of the tracks #1 to #n will have any value of "01" to "99". Also, in the lead-out area, the track number will be "AA".

Next, there is recorded information as an index, with which each track can be subdivided.

As an elapsed time in the track, MIN (minutes), SEC (seconds) and FRAME (frame number) are recorded.

An absolute time address is recorded as minutes, seconds and frame number in AMIN, ASEC and AFRAME.

5. HD FAT Structure

In the HD drive 60, ATRAC data to be recorded to a hard disc (HD) is to be managed per track according to a file system having a FAT (file allocation table). Namely, to implement data write or read to or from the hard disc 63, an actual access will be made with reference to the FAT-based file storage position management upon request from the HD controller 61.

Note that the "file" in the file system corresponds to "track" as ATRAC data in this case.

Figure 13:
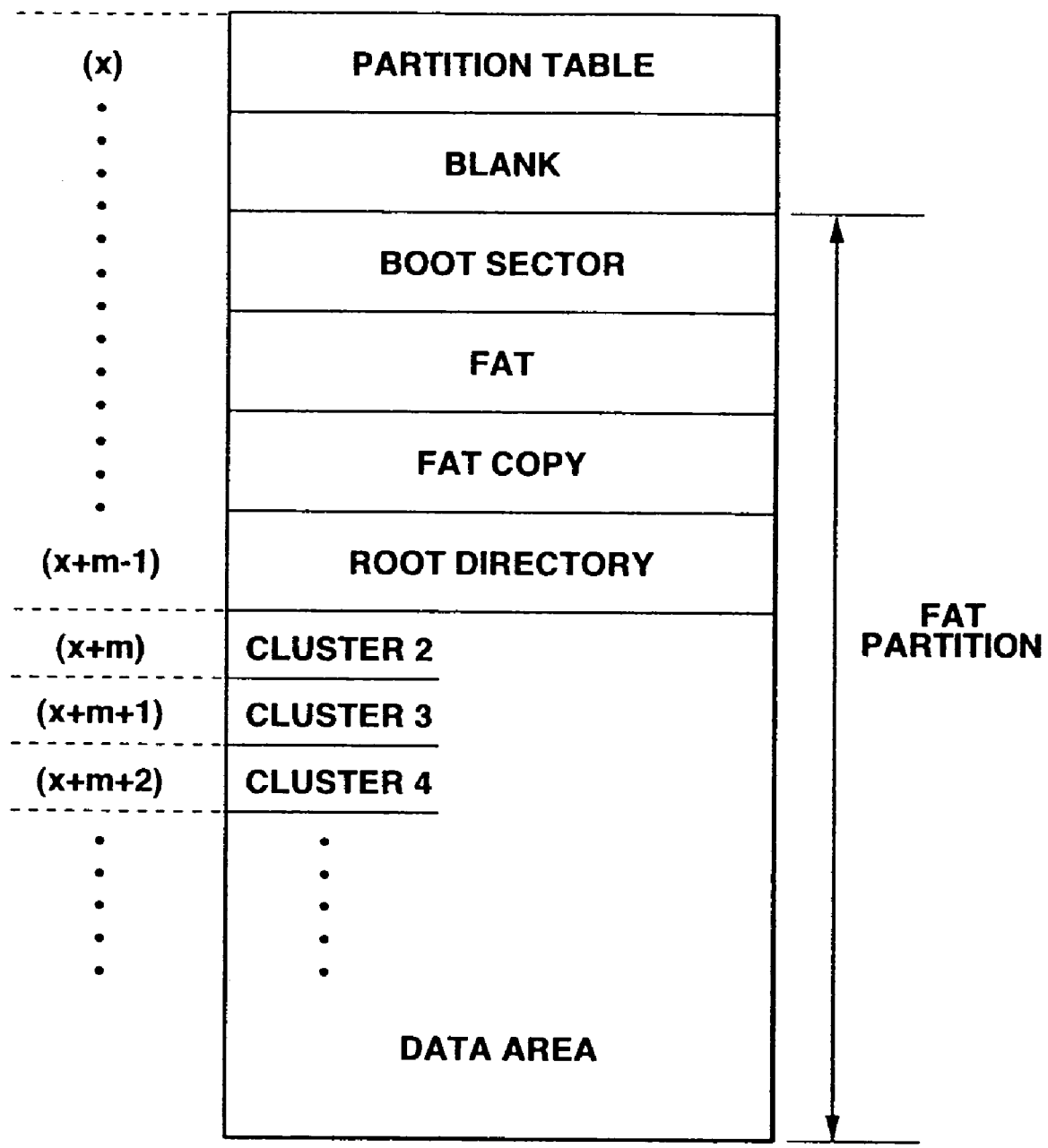
FIG. 13 explains the FAT structure.

An example of the FAT structure will be described below:

FIG. 13 schematically shows the structure of management by the FAT.

The FAT-management structure is composed of a partition table, blank area, boot sector, FAT, FAT copy, root directory and a data area as shown in FIG. 13.

The data area records unit data as clusters 2, 3, . . . . The "cluster" is one data unit in the management of data recorded in the hard disc by the FAT, and has a predetermined fixed length as data size.

At the left side of FIG. 13, there are shown cluster Nos. x, . . . , (x+m−1), (x+m), (x+m+1) and (x+m+2), . . . . For example, various data forming a FAT structure will be stored in each cluster.

Note that information is not actually stored in each of physically contiguous clusters as in this case.

In the FAT structure, a start address and end address of a FAT partition are stated in the partition table.

In the boot area, there is stated a FAT structure (size, cluster size, size of each area, etc.).

FAT is a table indicating a link structure of clusters forming together each file as will be described in detail later, and it is followed by an area in which a FAT copy is stated.

In the root directory, there are stated a file name, top cluster number and various attributes. It should be noted that each of these statements uses 32 bytes per file in this embodiment.

In the FAT, the FAT entry corresponds to a cluster in a one-to-one relation, and the number for a link destination, that is, the number for a cluster which comes next to the entry, is stated in the FAT entry. More specifically, in the case of a file composed of multiple files, first the number for a top cluster is recorded in the directory, and a next cluster number is recorded in the entry of the top cluster in the FAT. Further, a further cluster number is recorded in the entry of a next cluster. Such a link of clusters is stated in the FAT.

Figure 14:
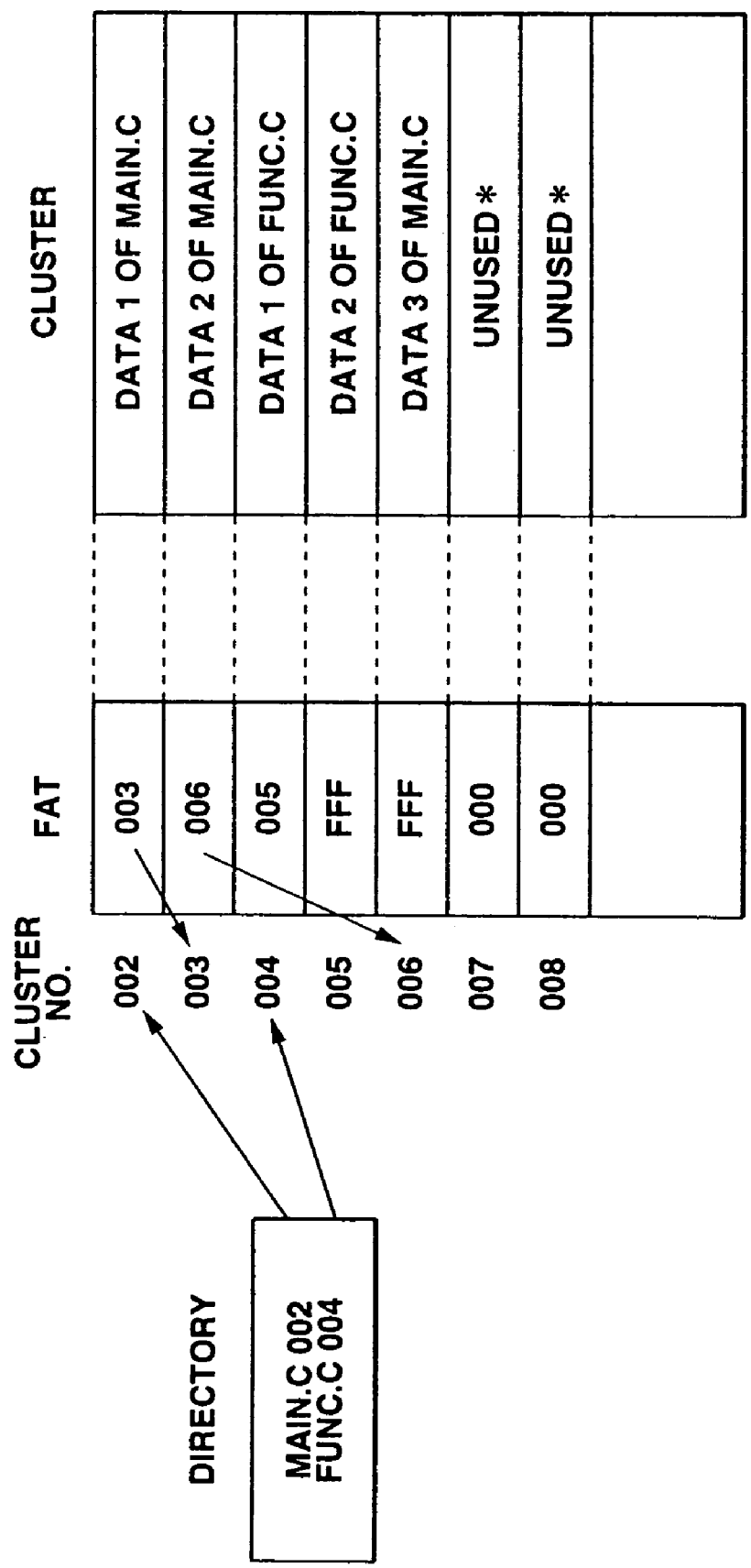
FIG. 14 shows the cluster management by the FAT.

FIG. 14 schematically illustrates the concept of such a link (numbers are in hexadecimal notation).

Assume for example that there are two files "MAIN. C" and "FUNC. C". In this case, the numbers for the top clusters in these two files, respectively, are stated as "002" and "004", respectively.

For the file "MAIN. C", a cluster No. "003" next to the cluster No. "002" is stated in the entry of the cluster No. "002", and a further cluster No. "006" is stated in the entry of the cluster No. "003". Further, on the assumption that the cluster No. "006" is the last cluster in the file "MAIN. C", "FFF" indicating that the cluster No. "006" is the last cluster is stated in the entry of the cluster No. "006".

Thus, the file "MAIN. C" is stored in the order of cluster Nos. "002", "003" and "006". Namely, if the cluster number coincides with a block number in the hard disc, it means that the file "MAIN. C" is stored in block Nos. "002", "003" and "006" in the hard disc.

Similarly, the file "FUNC. C" is stored in the order of "004" and "005" according to the FAT.

Note that the entry of a cluster corresponding to an unused block is "000".

In the directory of each file stored in the root directory area, there are stated the top cluster number shown in FIG. 14 as well as various data as shown in FIG. 15 for example.

More specifically, in the file directory, there are stated a file name, extension, attribute, change time information, change date information, top cluster number and file size with their respective predetermined numbers of bytes.

Also, the subdirectory, subordinate to a directory, is stored in the data area, not in the root directory area in FIG. 13. That is, the subdirectory is dealt as a file having a directory structure. The subdirectory is limitless in size and needs an entry for itself and an entry for its root directory.

Figure 16:
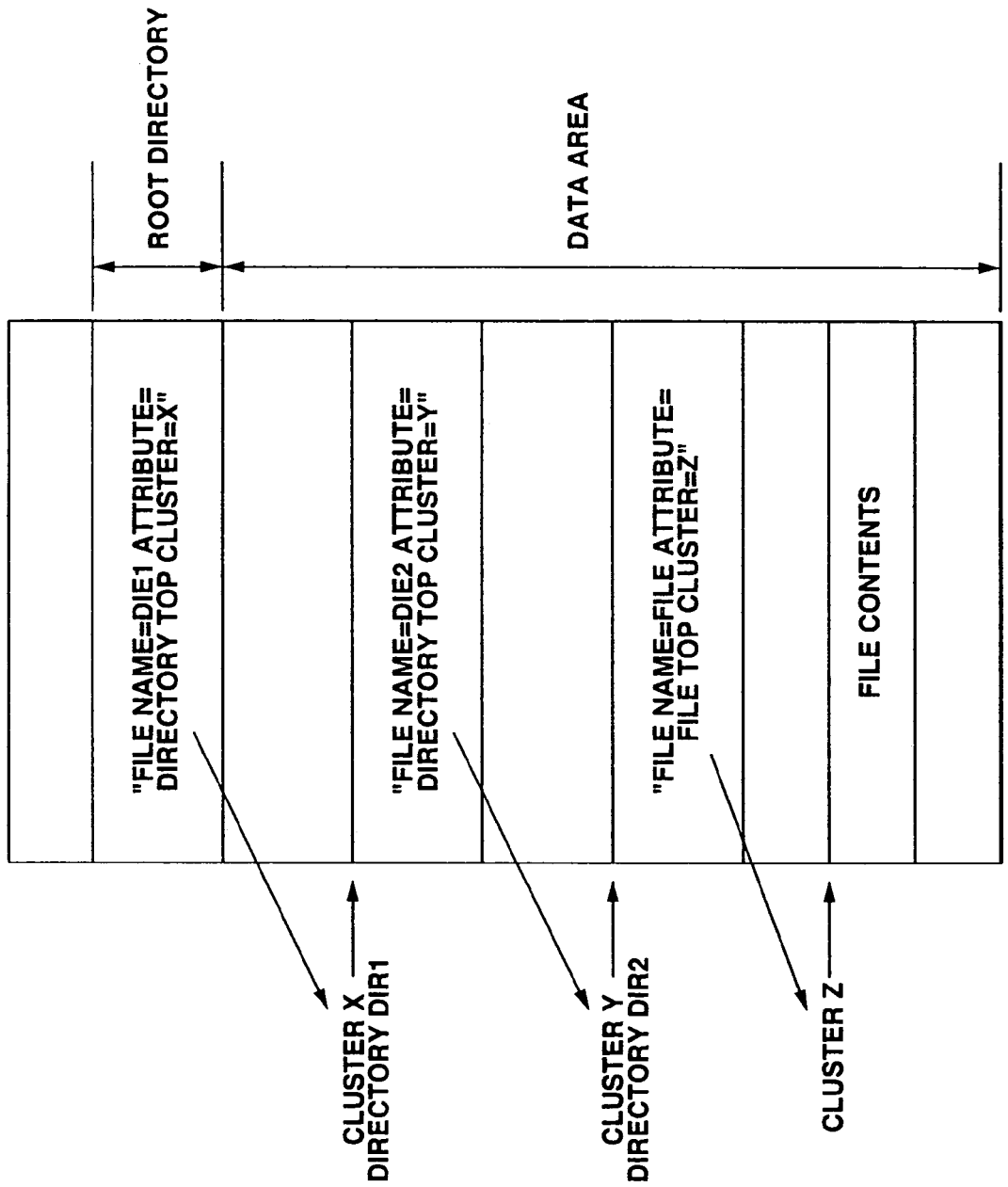
FIG. 16 shows the state of storage in the subdirectory and file.

FIG. 16 shows an example of the state of storage in the subdirectory and file, showing a file "DIR1" (whose attribute is a directory; namely, it is a subdirectory) in a root directory, a file "DIR2 (whose attribute is a directory; namely, it is a subdirectory) in the file "DIR1", and further a file "FILE" in the file "DIR2".

That is, in the root directory area, there is recorded the number for the top cluster as a file "DIR1" being a subdirectory. Clusters X, Y and Z are linked together according to the aforementioned FAT.

As shown in FIG. 16, the sub directories "DIR1" and DIR2" are dealt each as a file and incorporated in the FAT link.

Figure 17:
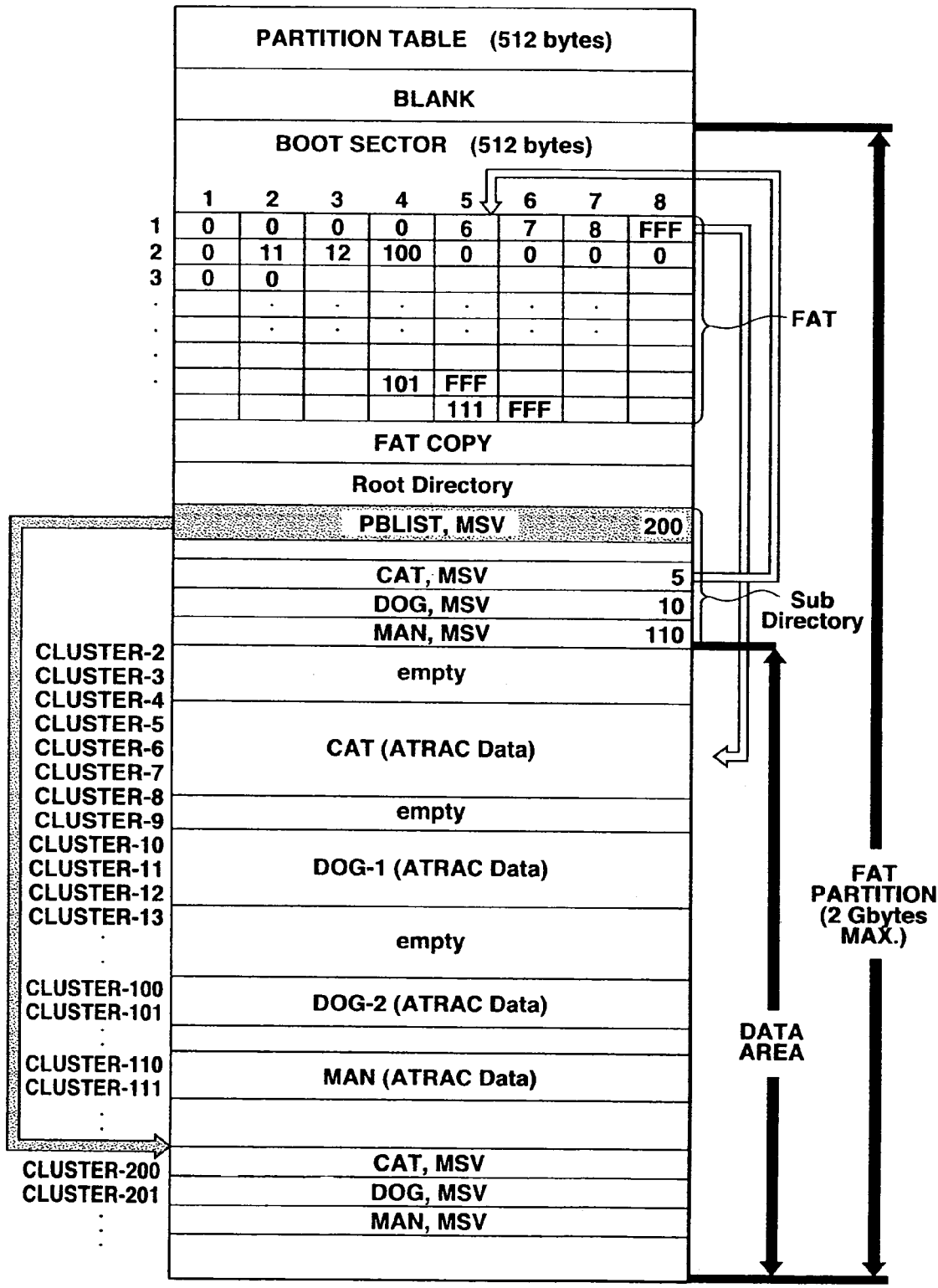
FIG. 17 shows a FAT-management structure according to the present invention.

The above description will be summarized below with reference to FIG. 17:

FIG. 17 shows a FAT-based management.

As shown in the memory map in the hard disc 63, the FAT management structure has stacked therein a partition table, blank area, boot sector, FAT area, FAT copy area, root directory area, subdirectory area and a data area.

The boot sector, FAT area, FAT copy area, root directory area, subdirectory area and data area are generically called "FAT partition area".

The partition table has recorded therein a start address and end address of the FAT partition area.

Note that the FAT used in an ordinary floppy disc has no partition table provided therein.

In the top area in the memory, an blank area will take place as shown since only the partition table is provided there.

The boot sector has recorded therein a size of the FAT structure, cluster size and size of each area correspondingly to whether the FAT is of 12 bits or 16 bits.

The FAT is intended to manage file positions recorded in the data area.

The FAT copy area is provided to back up the FAT.

The root directory has recorded therein a file name, top cluster address and various attributes, and uses 32 bytes per file.

The subdirectory exists as a file for the attribute of a file called "directory", and in the example shown in FIG. 17, there exist four files "PBLIST. MSV", "CAT. MSV", "DOG. MSV" and "MAN. MSV".

In the subdirectory, file names and recorded positions in the FAT are managed. That is, in FIG. 17, an address "5" in the FAT is managed in a slot in which the file name "CAT. MSV" is recorded, and an address "10" in the FAT is managed in a slot in which the file name "DOG. MSV" is recorded. Further, an address "110" is managed in a slot in which the file name "MAN. MSV" is recorded.

The actual data area includes the cluster 2 ans subsequent clusters, and according to this embodiment, ATRAC data is recorded in this area.

In this example, data on the file name "CAT. MSV" is recorded in clusters 5 to 8, a former-half part DOG-1 of the data on the file name "DOG. MSV" is stored in clusters 10 to 12, and a latter-half part DOG-2 of the data on the file name "DOG. MSV" is recorded in clusters 100 and 101.

Further, data on the file name "MAN. MSV" is recorded in clusters 110 and 111.

Also, the area "Empty" in the data area is a recordable area.

In this example, the file named "DOG. MSV" is an example that a single file is divided into two parts recorded discretely.

In this case, the cluster 200 and subsequent clusters form an area in which a file name is managed. The file "CAT. MSV" is recorded in the cluster 200, the file "DOG. MSV" is recorded in the cluster 201, and the file "MAN. MSV" is recorded in the cluster 202.

For rearranging the file order, it suffices to rearrange the order of the clusters 200 and subsequent clusters.

For example, the HD controller 61 detects a start address and end address of the FAT partition area by referring to the top partition table.

After reading the boot sector, the HD controller 61 will read the root directory and subdirectory.

The HD controller 61 searches the subdirectory for a slot in which reading management information "PBLIST. MSF" is recorded, and refers to an address of the trailing end of the slot having the information "PBLIST. MSF" recorded therein.

In the example shown in FIG. 17, since an address "200" is stored at the trailing end of the slot in which the information "PBLIST. MSF" is recorded, the HD controller 61 will make reference to the cluster 200 based on the address.

The aforementioned cluster 200 and subsequent clusters form together an area where a file name and file reading sequence are managed. In this example, the file "CAT. MSV" is first read, the file "DOG. MSV" is secondly read, and the file "MAN. MSV" is thirdly read.

After making reference to all the cluster 200 and subsequent clusters, the HD controller 61 goes to the subdirectory, and refers to slots corresponding to the file names "CAT. MSV", "DOG. MSV" and "MAN. MSV", respectively.

In the example shown in FIG. 17, an address "5" is stored at the trailing end of the slot in which the file name "CAT. MSV" is stored, an address "10" is stored at the trailing end of the slot in which the file name "DOG. MSV" is stored, and an address "110" is stored in the slot in which the file name "MAN. MSV" is stored.

For example, when the HD controller 61 searches the FAT for an entry address based on the address "5" in the slot with the file name "CAT. MSV", it will find a cluster address "6" entered. When the HD controller 61 refers to an entry address "6", it will find a cluster address "7" entered. When the HD controller 61 refers to an entry address "7", it will find a cluster address "8" entered. When the HD controller 61 makes reference to an entry address "8", it will find that there is recorded a code indicating a trailing end "FFF".

Therefore, the file "CAT. MSV" uses the clusters 5, 6, 7 and 8. By making reference to the clusters 5, 6, 7 and 8 in the data area, the HD controller 61 can access an area in which there is actually recorded ATRAC data "CAT. MSV".

Searching the FAT for a file "DOG. MSV" discretely recorded is effected as follows:

As shown, at the trailing end of the slot in which the file "DOG. MSV" is recorded, there is recorded an address "10".

When the HD controller 61 searches the FAT for an entry address based on the address "10", it will find a cluster address "11" entered. Referring to an entry address "11", the HD controller 61 will find a cluster address "12" entered. Referring to an entry address "12", the HD controller 61 will find a cluster address "100" entered. Referring to an entry address "100", the HD controller 61 will find a cluster address "101" entered. Referring to an entry address "101", the HD controller 61 will find that there is recorded a code indicating a trailing end "FFF".

Therefore, the file "DOG. MSV" uses the areas of the clusters 10, 11, 12, 100 and 101. Referring to the clusters 10, 11 and 12 in the data area, the HD controller 61 can access an area in which there is actually recorded ATRAC data corresponding to the former-half part of the file "DOG. MSV".

Further, referring to the clusters 100 and 101 in the data area, the HD controller 61 can access to an area in which there is actually recorded ATRAC data corresponding to the latter-half part of the file "DOG. MSV".

Also, searching the FAT for an entry address based on an address "110" in the slot with the file "MAN. MSV", the HD controller 61 will find a cluster address "111" enter. Referring to an entry address "111", the HD controller 61 will find that there is recorded a code indicating a trailing end "FFF".

Therefore, the HD controller 61 will detect that the file "MAN. MSV" uses an area including the clusters 110 and 111.

As above, a file (track) recorded in the hard disc can be read by making reference to the FAT, and even when the files are discretely recorded, they can be linked together for sequential reading.

6. Dubbing Operation—Example 1

One of the characteristics of the embodiment of the dubbing apparatus according to the present invention is to organize such a FAT as management information to manage ATRAC data to be recorded to the hard disc 63 appropriately in units of a file per track that when dubbing the data by the HD drive 60.

As having previously been described, the dubbing apparatus according to the present invention is adapted to execute four patterns of dubbing among the MD drive 1, CD drive 30 and HD drive 60. Of these four patterns of dubbing operation, the dubbing from CD to HD, in which the FAT management can be applied, will be described as a typical example with reference to FIGS. 18 to 20.

In the dubbing from CD to HD, signals flows as will be described below:

Namely, a PCM signal read from a CD by the CD drive 30 is transferred once to the MD drive 1 where it will undergo audio compression for conversion to ATRAC data. The ATRAC data is transferred to the HD drive 60 where it will be written to the internal hard disc 63.

Figure 18:
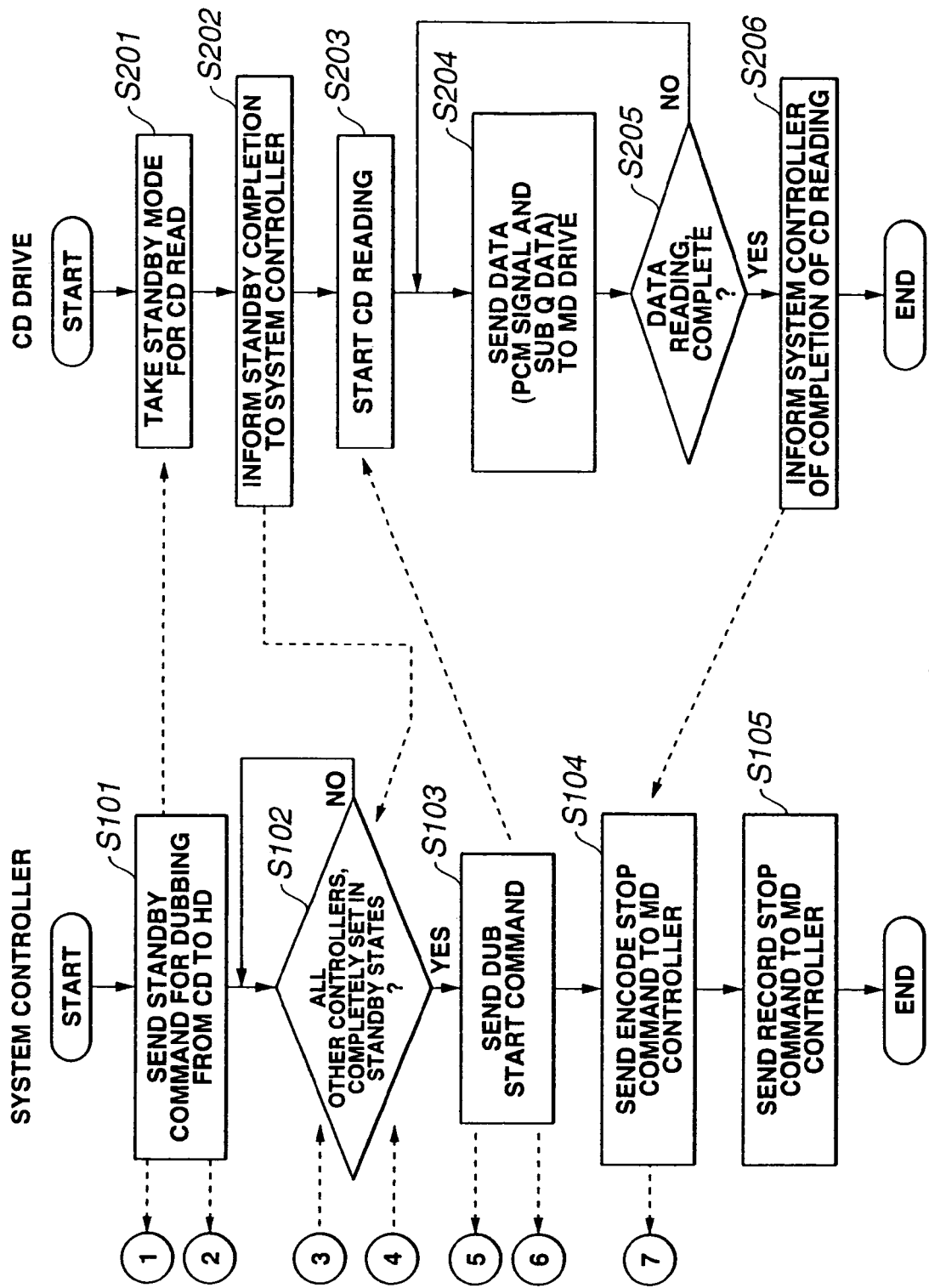
FIG. 18 shows a flow of operations effected for implementing an example of dubbing operation in the dubbing apparatus according to the present invention.
Figure 19:
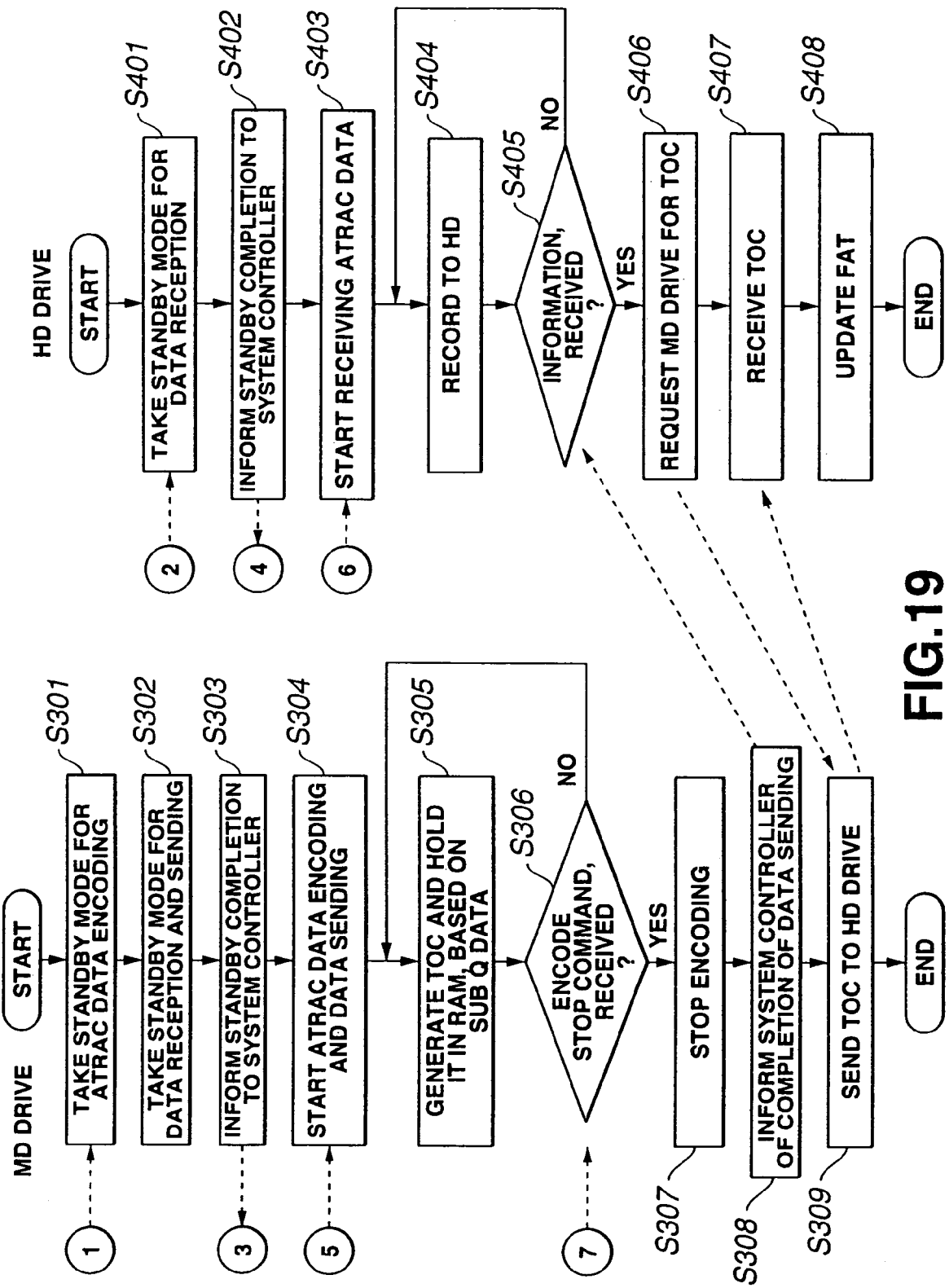
FIG. 19 shows a flow of operations effected for implementing an example of dubbing operation in the dubbing apparatus according to the present invention.

FIG. 18 is a flow chart showing operations effected for implementing an example of the dubbing from CD to HD in the system controller 80 and CD controller 50 of the CD drive 30. FIG. 19 shows a flow of operations effected for implementing an example of the same dubbing from CD to HD in the MD controller 11 of the MD drive 1 and HD controller 61 of the HD drive 60. These controllers operate in parallel with each other. In FIGS. 18 and 19, the steps of operation indicated connected by dashed lines with an arrow from one step to another include communications made by the controllers via the system control bus 20 and operations made in response to such communications. In case a dashed line with arrow extends over FIGS. 18 and 19, an encircled figure (number) is used to indicate a connection to be made by the dashed line.

For example, the user loads a CD, a dubbing source, into the CD drive 30 and operates the control panel or operation unit 83 to start the operation of dubbing from CD to HD.

Accordingly, first in step S101 in FIG. 18, the system controller 80 will send a command for standby for the CD-to-HD dubbing operation to each of the other controllers via the system control bus 20.

Each of the other controllers will operate as follows in response to the standby command from the system controller 80:

Namely, in step S201 in FIG. 18, the CD controller 50 will set the CD drive 1 in a standby state for reading the CD currently loaded in the CD rive 1. This "standby" state is such that an address on the disc, corresponding to a predetermined data position, is accessed with the CD 91 being in rotation at a predetermined speed and the optical head 32 so that CD reading can be started immediately at a predetermined reading position, for example. When the CD drive 1 is set in the standby state, the CD controller 50 informs, in next step S202, the system controller 80 that it has completely been set in the standby mode.

Also, having received the standby command send from the system controller 80 in step S101, the MD controller 11 controls, in step S301 in FIG. 19, the audio-compression encoder/decoder 14 to be in a mode of operation for encoding the input PCM signal to ATRAC-compressed data (ATRAC data). Also, in next step S302, the MD controller 11 controls the internal audio data interface 15 to be in a state for reception of the PCM signal read by the CD drive 30 and transferred from the latter and also in a state for sending the ATRAC data to the HD drive 60. In steps S301 and S302, the MD controller 11 is set in the standby state. Then in next step S303, the MD controller 11 informs the system controller 80 that it has completely been set in the standby state.

In response to the standby command sent from the system controller 80 in step S101, the HD controller 61 will be set, in step S401 in FIG. 19, in a standby state for receiving the ATRAC data transferred via the audio data interface 15 of the MD drive 1. Then in step S402, the HD controller 60 informs the system controller 80 that it has completely been set in the standby state.

In step S102 next to step S101, the system controller 80 determines whether the other controllers have completely been set in the standby modes. Namely, it waits for the standby-completion information sent from all the other controllers (CD, MD and HD). Receiving the information from all the other controllers, the system controller 80 gets an affirmative determination (YES) in step S102 and will go to step S103.

In step S103, the system controller 80 sends a dubbing start command to each of the other controllers.

Receiving the dubbing start command, the CD controller 50 controls, in step S203 in FIG. 18, the CD drive 1 to start reading the CD loaded in the CD drive 1.

After the CD drive 1 has started the CD reading, the system controller 80 goes to step S204 where it will send, to the MD drive 1, a PCM signal produced by the CD reading and sub Q data extracted from a sub code inserted in the read data. According to this embodiment, the PCM signal is transferred from the audio data interface 40 in the CD drive 30 to the audio data interface 15 in the MD drive 1, while the sub Q data is sent to the MD controller 11 via the system control bus 20.

The operation in step S204 is done until it is determined in next step S205 that the reading of the CD 91 is complete.

As the results of the operations made in step S204, the PCM signal as the data read from the dubbing source and sub Q data inserted in the read data will be sent from the CD drive 30 to the MD drive 1.

In step S304, the MD controller 11 provides such a control as to start a procedure in which at the start of receiving the PCM signal transferred from the CD drive 30, the data stream as the PCM signal will be supplied to the audio-compression encoder/decoder 14, the data stream be encoded by the encoder/decoder 14 to ATRAC data and the ATRAC data thus obtained be transferred to the HD drive 60 via the audio data interface 15.

In parallel to the control over the conversion to the ATRAC data and transfer of the data in step S304, the MD controller 11 controls operations in step S305 as follows. Namely, in step S305, the MD controller 11 generates an HD TOC based on sub Q data synchronous with the PCM signal, sent from the CD drive 30 via the system control bus 20 and holds it in the RAM 17 for example. These operations will be described in detail later with reference to FIG. 20.

For example, as the audio-compression encoder/decoder 14 encodes, by compression, the input PCM signal to ATRAC data, it counts the ATRAC data by an encode counter. More specifically, the encode counter counts an aggregate size of the ATRAC data after encoded in units of cluster, sector and sound group. The MD controller 11 can make reference to the count from the encode counter by taking it in.

FIG. 20A shows, along the time base, the counting made by the encode counter.

When the encoding has been done, the MD controller 11 is supplied with sub Q data synchronous with the PCM signal from the CD drive 30 via the system control bus 20.

The data stream as PCM signal read by the CD drive 1 and transferred from the latter is a time-axial succession of data in multiple tracks unless only one track is read and the read data is sent.

As will be apparent from the description of the sub-coding format of the CD, in case Q-channel data is inserted in audio data as a track, it includes time information per track in minutes, seconds and frames. Therefore, the CD controller 11 can monitor the time information represented by the Q-channel data and thus determine, as a breakpoint of a track, a time point at which the time information loses its continuity when the optical head shifts from one track to another.

Assume here that the sub Q data has lost its continuity at a time t1 after encoding has started at a time t0 for example as shown in FIG. 20A.

At a predetermined time corresponding to a time at which it is recognized that the sub Q data has lost its continuity, the MD controller 11 will acquire a count in the encode counter.

Based on the thus acquired count from the encode counter, the MD controller 11 will generate an HD TOC as shown in FIG. 20B by the use of the RAM 17. At this time, the RAM 17 will store the data from the encode counter in correlation with a track 1 indicating a first encoded track in such a manner that the size of the data acquired from the encode counter is represented as a data size being a total of "cluster size", "sector size" and "sound group size". In this case, the size of ATRAC data as the track 1 is represented by "0046h" for a cluster, "0fh" for a sector, and "09h" for a sound group.

Note for confirmation that track numbers such as track 1, track 2, track 3, . . . defined in the HD TOC are orders of, and numbers for, encoded tracks but they do not correspond to track numbers of copy-source audio data managed based on the CD TOC for example.

Since the sub Q data has no continuity at times t2, t3, t4 and t5 after the time t1 as shown in FIG. 20A for example, the RAM 17 sequentially stores the count in the encode counter (size of the ATRAC data) acquired at predetermined times corresponding to the times t2 to t5, respectively, as tracks 2, 3, 4, 5, . . . so that the count is represented by a data size being a total of "cluster size", "sector size" and "sound group size" as shown in FIG. 20B.

Thus, the MD controller 11 generates the HD TOC based on the sub Q data and count in the encode counter, and holds it in the RAM 17. This is the operation to be made in step S305 in FIG. 19.

The HD TOC thus generated permits to detect the data size of each track. That is, for the track 1, the data size stored in the HD TOC is straightly applied. Also, for each of the track 2 and subsequent tracks, a data size can be determined by subtracting a data size stored correspondingly to a preceding track from a data size stored for the track.

Description will be made with reference to the flow charts in FIGS. 18 and 19 again.

The operation in step S305 will continue until the MD controller 11 receives a encode stop command from the system controller 80 in step S306.

In response to a dubbing start command received from the system controller 80, the HD controller 61 of the HD drive 60 starts receiving ATRAC data in step S403 in FIG. 19. Thus, the ATRAC data resulted from encoding of the PCM signal in the MD drive 1 will be taken into the HD drive 60. For transferring the ATRAC data to the HD drive 60, the MD drive 1 will be controlled to send the ATRAC signal in packets of a predetermined fixed length for compliance with the reception of the ATRAC signal by the HD drive 60. That is, the digital audio interface 15 of the MD drive 1 will packetize the ATRAC data for sending.

Then the HD controller 61 goes to next step S404 where it will provide a control under which he received ATRAC data is transferred to the HD driver 62 and written to the hard disc 63. This operation in step S404 continues until the HD controller 61 receives an information of ATRAC data sending completion from the MD controller 11 in step S505.

As having been described in the foregoing, the system controller 80 and other controllers (MD controller 11, CD controller 50 and HD controller 61) work in collaboration with each other to compress the audio data read from a CD to ATRAC data, and dub the data to the hard disc 63. At this time, an HD TOC as shown in FIG. 20B will be generated in the MD drive 1.

When there exists no more data to read in the CD as the above dubbing operation is made, the CD controller 50 will inform, in step S206 in FIG. 18, the system controller 80 that the CD reading is complete.

Receiving the above information, the system controller 80 goes to step S104 in FIG. 18 where it will send an encode stop command to the MD controller 11 via the system control bus 20.

When an affirmative result (YES) of determination is provided in step S306 in FIG. 19, the MD controller 11 goes to step S307 where it will stop the encoding at a time corresponding to the trailing end of the PCM signal transferred from the CD drive 30. In step S308, at a time when the ATRAC data resulted from the encoding has been sent to the end thereof, the MD controller 11 informs, via the system control bus 20, the HD controller 61 that the data sending has ended.

The HD controller 61 will receive the information of the ending of data sending, sent from the MD controller 11 in step S308, whereby a determination made in step S405 in FIG. 19 will be affirmative (YES) so that the HD controller 61 will stop data write to the hard disc 63 and go to step S406.

In a phase just after data has been recorded to the hard disc 63 in the HD drive 60, the ATRAC data as dubbing data has been written to an area having so far been unused under the control of the HD controller 61. However, even if multiple tracks of ATRAC data have been recorded, they are not entered in the FAT as files corresponding to the multiple tracks. Therefore, new data having thus been recorded should be managed in each file appropriately corresponding to each track. Step S406 and subsequent steps are intended for such a management. In step S406, the HD controller 61 requests the MD controller 11 for an HD TOC.

Receiving the request, the MD controller 11 sends, in step S309, an HD TOC currently held in the RAM 17 to the HD controller 61.

In step S407, the HD controller 61 receives the HD TOC sent from the MD controller 11. Then, it goes to step S408 where it will update the FAT based on the contents of the received HD TOC.

That is, it is possible to recognize, from the contents of the HD TOC, the size of each track of the new ATRAC data recorded in the hard disc 63.

To this end, the HD controller 61 computes the contents of the HD TOC to determine a data size of each track. It should be noted that the data size stated in the HD TOC is a total of "cluster size", "sector size" and "sound group size" depending upon an MD format. When it is desired to give a data size in bytes in order to compile the form of the HD TOC in a form available to the FAT, the contents of the HD TOC should be computed based on a relation that one sound group is of 212 bytes, one section is of 2352 bytes and one cluster (=36 sectors) is of 2352 by 36 bytes.

The FAT is updated by dividing a newly recorded data area by a file unit correspondingly to a data size determined as above.

In this embodiment, for dubbing data to the hard disc 63, the MD drive 1 where the data will be compressed first generates an HD TOC based on information indicating an accurate track breakpoint. As in FIGS. 18 and 19, a track breakpoint is determined based on sub Q data of a sub code inserted in audio data having the CD format.

In the HD drive 60, the FAT is updated by acquiring the TOC having been generated as above after completion of the data recording.

According to this embodiment, ATRAC data is recorded to the hard disc 63. As well known, the format of the ATRAC data has not included in the sub code any time information like sub Q data. Therefore, it is not possible to adopt the method of determining a track breakpoint by monitoring the continuity of sub Q data, adopted in the conventional dubbing to MD.

In this embodiment, since the FAT is updated using an HD TOC generated in the MD drive as above, even when audio-compressed data such as ATRAC data is to be dubbed, dubbing data recorded in the hard disc 63 can be managed for each file appropriately corresponding to each track.

Figure 20:
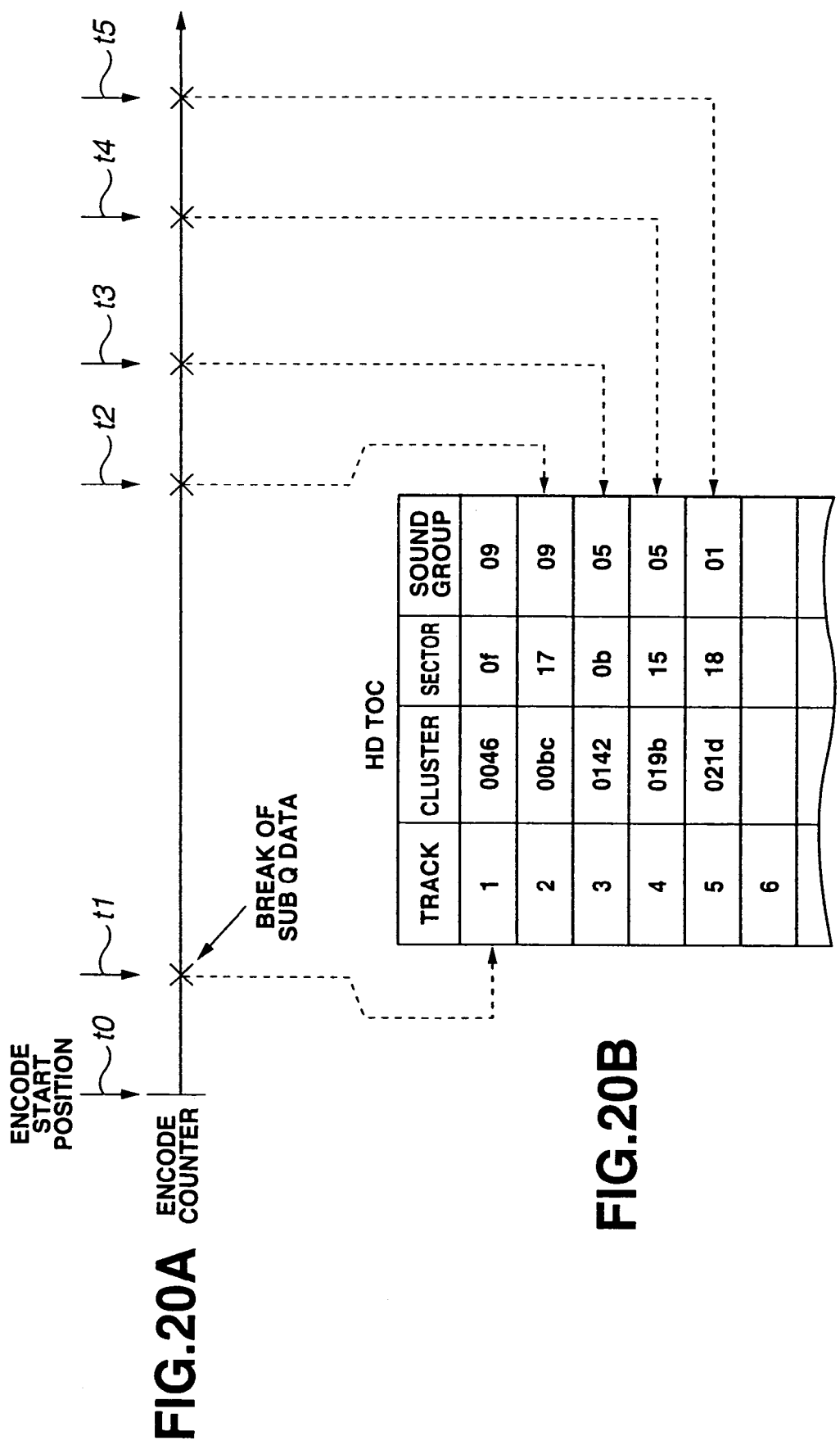
FIGS. 20A and 20B show a procedure for generation of an HD TOC based on the monitoring of sub Q code.

For the CD-to-HD dubbing having been described with reference to the flow charts in FIGS. 18 to 20, the HD TOC is generated by the MD drive 1. However, the HD TOC may be generated by the CD drive 30 as will be described below:

As having previously been described with reference to FIGS. 11 and 12, a TOC including sub Q data is stated in the lead-in area of a CD. In the CD TOC, a start address of each track is represented by minutes (PMIN), seconds (PSEC) and frame number (PFRAME) along the time base. Therefore, an HD TOC corresponding to ATRAC data can of course be generated based on the CD TOC information being such a time-based representation.

As mentioned above, in the representation of a CD TOC by minutes, seconds and frame number, one frame in the CD format is about 13.3 msec. Each of the cluster, sector and sound group of ATRAC data takes the following time for reading:

| | |
|---|---|
| One cluster | 2043 msec |
| One sector | 68.85 msec |
| One sound group | 11.6 msec |

By making a computation in a predetermined manner, a reading time for each track, available from the CD TOC, can easily be converted into a data size being a total of "cluster size", "sector size" and "sound group size". The result of this conversion can be used to generate a similar HD TOC to the one shown in FIG. 20B. Also in this case, since an HD TOC to be generated is based on a CD TOC, a breakpoint position of each track can sufficiently be relied upon.

7. Dubbing Operation—Example 2

According to the embodiment of the present invention, data recorded in an MD is managed as in the aforementioned dubbing procedure also in dubbing data from an HD to the MD. The HD-to-MD dubbing will also be explained herebelow.

Figure 21:
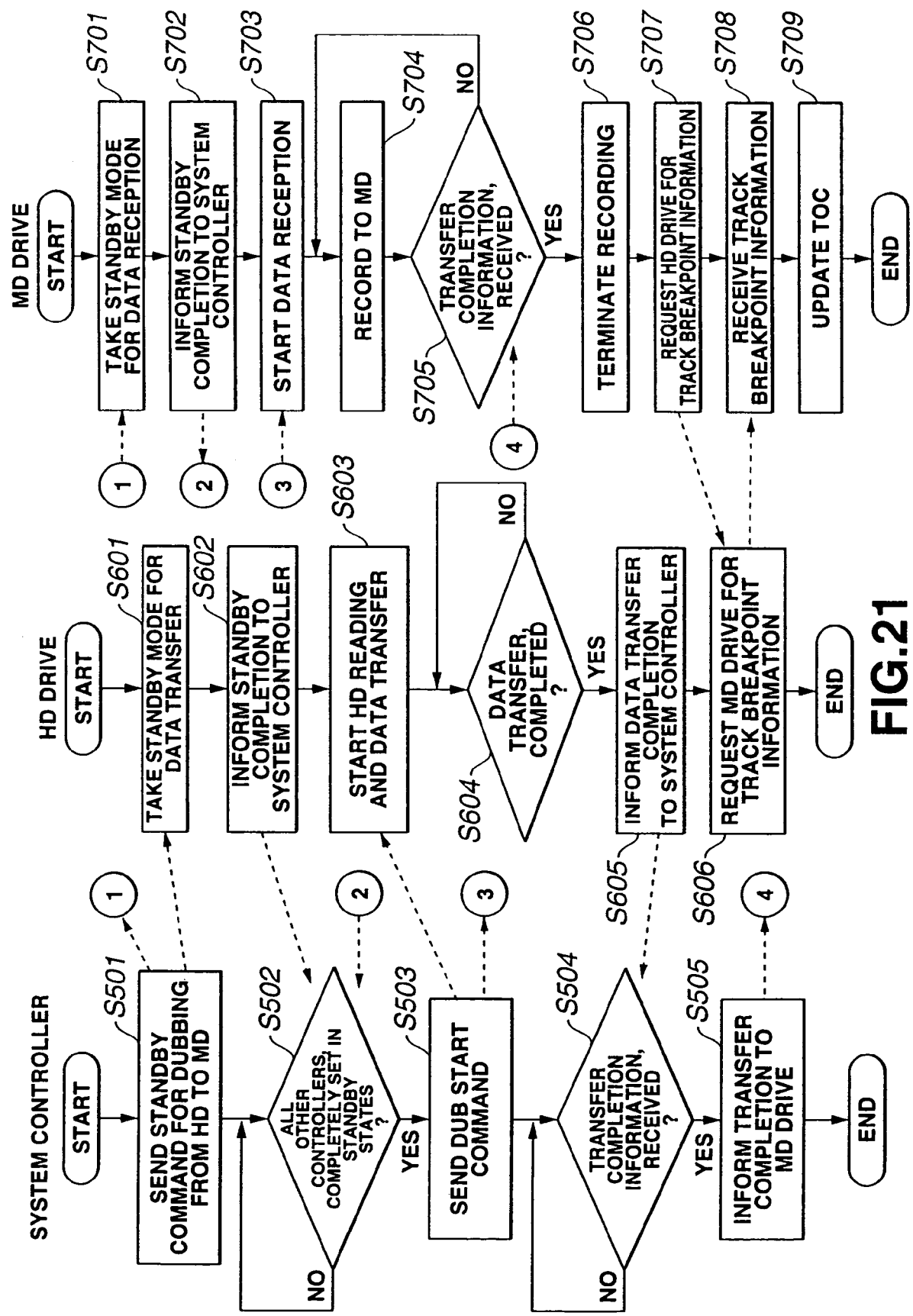
FIG. 21 shows a flow of operations effected for implementing another example of dubbing operation in the dubbing apparatus according to the present invention.

FIG. 21 is a flow chart showing operations to be done by the system controller 80, HD controller 61 and MD controller 11 in the HD-to-MD dubbing. Also in this case, the controllers effect the operations in parallel with each other. Also in FIG. 21, the steps of operation indicated connected by dashed lines with an arrow from one step to another include communications made by the controllers via the system control bus 20 and operations made in response to such communications. For the convenience of illustration and description, the communication relation between the system controller 80 and MD controller 11 is indicated with an encircled figure (number) appended to a dashed line.

Also in this case, it is assumed for example that the user has loaded an MD, a dubbing source, into the MD drive 1 and operated the control panel or operation unit 83 to start the operation of dubbing from HD to MD.

In response to the above operations by the user, the system controller 80 will first send, in step S501 in FIG. 21, a command for standby for the HD-to-MD dubbing operation to each of the other controllers via the system control bus 20.

In response to the standby command, the HD controller 61 takes, in step S601, a standby mode for data transfer to the MD drive. Then it goes to next step S602 where it will inform the system controller 80 that it has completely been set in the standby mode.

Also, having received the standby command send from the system controller 80, the MD controller 11 controls, in step S702, the audio data interface 15 to set a standby mode for receiving ATRAC signal transferred from the HD drive 60. Then in next step S702, the MD controller 11 informs the system controller 80 that it has completely been set in the standby state.

The system controller 80 waits in step S502 until the standby mode is completely set. Upon reception of a standby completion information from the HD drive 60 and MD drive 1, the system controller determines that the standby mode has been set, and goes to step S503.

In step S503, the system controller 80 sends an HD-to-MD dubbing start command to the HD controller 61 and MD controller 61.

Receiving the dubbing start command, the HD controller 61 provides a control to start data read from the hard disc 63 and data transfer to the MD drive 1 in step S603.

Namely, the HD controller 61 controls the HD driver 62 to read more than one file (track) of ATRAC data, defined by the user for example, from the hard disc 63. And it transfers the stream of thus read ATRAC data to the audio data interface 15 of the MD drive 1.

These operations for data read and transfer continue until it is determined in next step S604 that all data to be read have been read and transferred.

Receiving the dubbing start command, the MD controller 11 goes to step S703 where it will start receiving the stream of ATRAC data transferred from the HD drive 60. Then in step S704, the MD controller 11 provides a control to write received ATRAC data to a free area in the MD currently loaded in the MD drive 1. It should be noted for confirmation that since the received input data has already been compressed as ATRAC data, it will not be encoded for audio compression in the audio-compression encoder/decoder 14 but undergo EFM modulation and addition of error correction code in the EFM/ACIRC encoder/decoder 8 for recording to the MD.

The control over the recording of the received ATRAC data to the MD will continue until it is determined in step S705 that a transfer completion information has been received.

When the HD drive 60 has completely rad all files of ATRAC data to be read from the hard disc 63 and the read ATRAC data has completely been transferred to the MD drive 1, namely, when the determination in step S604 is affirmative (YES), the HD controller 61 will go to step S605 where it will inform the system controller 80 that the data transfer to the MD drive 1 is complete.

After sending the dubbing start command in step S503, the system controller 80 waits until it is determined in step S504 that the transfer completion information sent from the HD controller 61 has been received. Receiving the transfer completion information sent from the HD controller 61, namely, when the result of the determination made in step S504 is affirmative (YES), the system controller 80 will go to step S505.

In step S505, the system controller 80 controls the MD drive 1 to inform that the data transfer from the HD drive has been complete.

Since the reception of the transfer completion information sent in step S505 will lead to an affirmative result of the determination made in step S705, the MD controller 11 goes to step S706.

In step S706, the MD controller 11 will terminate the data write being done to the MD at a time when it can be determined that the ATRAC data transferred from the HD drive has completely been written to the MD.

Also in this case, even in case the ATRAC data read from the HD is a link of multiple tracks, the ATRAC data having so far been dubbed to the MD are not managed in units of a track but are managed as one track of data for example in the MD drive.

In step S707, the MD controller 11 sends, to the HD controller 61, a request command for track breakpoint information.

Upon reception of the track breakpoint information request command, the HD controller 61 sends, in step S606, track breakpoint information to the MD controller 11.

That is, the HD controller 61 refers to the contents of the FAT and generates information from which a track breakpoint of the ATRAC data read from the hard disk and transferred for dubbing can be recognized by the MD drive. In this case, for example, a data size of each file (track) should be determined from the contents of the FAT and a TOC similar in form to that shown in FIG. 20B be generated based on the data size. The HD controller 61 will send the thus generated breakpoint information to the MD controller 11.

As above, the track breakpoint information sent from the HD controller 61 is received by the MD controller 11 in step S708.

In step S709, the MD controller 11 will update the management information based on the thus received track breakpoint information. That is, new dubbed data having been managed as one track of data is divided according to the track breakpoint information into tracks, and the U-TOC (user table of contents) is updated for appropriate management of each of the divisional tracks.

Also for the dubbing from HD to MD, track breakpoints cannot be registered for dubbing data in dependence on the continuity of time information such as sub Q data. Also in this case, breakpoint information capable of an indicating track breakpoint, generated based on the FAT being management information held by the HD drive as in the former example of dubbing, will accurately indicate a track breakpoint. A U-TOC updated based on the track breakpoint information will have contents which can accurately manage the breakpoint of a track dubbed to the MD.

Note that the aforementioned dubbing apparatus should preferably be designed such that data to be recorded to the hard disc 63 for example can be encrypted for preventing the data from being copied illegally. That is, the HD controller 61 should preferably be provided with an encrypting function to encrypt recorded data which is going to be transferred to the HD drive. In the case of a legal playing such as dubbing to the MD drive 1 inside the dubbing apparatus or audio output for monitoring, the data read from the HD 63 is decrypted for outputting. For a dubbing of data to any external apparatus, the data is outputted as digital data still encrypted or decrypted for outputting only when it has been authenticated through a communication with the external apparatus.

In the foregoing, the dubbing operation to be completed within the dubbing apparatus has been described. However, the present invention can be applied for dubbing of an external audio data to the MD or hard disc. In this case, identification information with which track breakpoints of a stream of input audio data can be discriminated should be acquired by a separately provided communications line from an external apparatus which provides source output, and the management information such as the FAT and U-TOC should be updated as in the foregoing description.

According to the present invention, track breakpoint information, generated based on the TOC for example, has not to be synchronous with dubbing data as the sub Q data. So, even when the dubbing source is analog data, a breakpoint of almost precisely each track can be managed for dubbed data as along as track breakpoint information with which the size of each track can be recognized is acquired.

Also, the aforementioned embodiment of the present invention has been described concerning, the generation of management information for recording ATRAC-compressed digital audio data. However, the present invention is not limited to this embodiment. That is, the present invention may be used with audio data compressed by any other compression method and moreover with moving picture data compressed by a predetermined compression method. Further, the present invention may be used with a compressed text or still picture. Also, the method of track management according to the present invention may be applied to dubbing of data not compressed.

INDUSTRIAL APPLICABILITY

To compress data output from a source output apparatus (CD drive) for example, and transfer the compressed data to a first recorder (HD drive) in which the data will be recorded to a first recording medium, the present invention generates program breakpoint information based on specified information capable of indicating program breakpoint of data read from the CD drive. The first recorder generates first management information based on the breakpoint information.

In the above system of the first recorder, precisely the dubbed data can be managed appropriately managed per track without having to monitor such information, like sub Q data, as is capable of indicating a break of each track synchronously with a stream of dubbing data.

Thus, in a dubbing apparatus or system for dubbing among various types of media, constructed according to the present invention, dubbed data can be managed in units of a track automatically at the time of dubbing and also accurately irrespectively of any differences of the data formats of the media from each other.

Also, to compress dubbing source data output from a source output apparatus and transfer the compressed data to a first recorder in which the data will be dubbed to a first recording medium, a second recorder/player can be provided which has a function of encoding by compression. In this case, the compression encoding function of the second recorder/player may be used to compress the dubbing source data output from the source output apparatus. Thus, the dubbing apparatus will have more functions and be less expensive.

In this case, it is possible for the second recorder/player to easily generate breakpoint information by taking, as a base, a data format defined for a second recording medium compatible with the second recorder/player.

When information with which a break of each program can be recognized, such as sub Q data, is inserted in dubbing source data, accurate-breakpoint information can be generated. Therefore, the breakpoint information can show accurate contents as first management information to manage data finally recorded in a first recording medium in a first recorder in units of a program.

By generating breakpoint information based on the contents of a TOC as management information read from a third recording medium in a source output apparatus, it is possible to provide accurate-breakpoint information.

To transfer data read from a first recorder to a second recorder in which the data will be recorded, second management information to be recorded to a second recording medium is generated based on first management information held in the first recorder. In this case, the second management information will have accurate contents since it is based on the first management information (FAT).

The invention claimed is:

1. A recording apparatus comprising:
   a receiving unit configured to receive output data by a succession of program units;
   a compressing unit configured to receive the output data received by the receiving unit and compress the data to generate compressed data;
   a breakpoint information generator configured to generate breakpoint information indicative of a per-program breakpoint of the compressed data based on specified information indicating a per-program breakpoint of the output data received by the receiving unit;
   a first recording unit for receiving the compressed data and recording the data to a predetermined first recording medium;
   a first management information generator configured to generate first management information for managing the operation of read/write from/to the first recording medium in such a manner that the data recorded in the first recording unit are managed per program based on the breakpoint information;
   a second management information generator configured to generate, based on the first management information acquired from the first recording unit, second management information to manage the compressed data per program in a second recording medium; and
   a sending unit configured to send the compressed data in the first recording medium and the second management information to the second recording medium.

2. The apparatus according to claim 1, further comprising a second recording unit including the compressing unit and configured to record the compressed data and the second management information to the second recording medium in such a manner the data is managed per program.

3. The apparatus according to claim 2, wherein the breakpoint information generator generates the breakpoint information according to a data format specified for the second recording medium.

4. The apparatus according to claim 1, wherein the breakpoint information generator is further configured to recognize a break of each program unit based on a predetermined type of information inserted in output data received by the receiving unit and by which the per-program break can be recognized, and generates the breakpoint information based on the result of recognition.

5. The apparatus according to claim 1, wherein the receiving unit reads a predetermined third recording medium to which there are recorded pre-compressed data and management information for management of the pre-compressed data per program; and wherein
   the breakpoint information generating means recognizes the per-program break based on the management information read from the third recording medium by the source output unit and generates the breakpoint information based on the result of recognition.

6. A recording method comprising:
   receiving data by a succession of program units;
   compressing the data to generate compressed data;
   generating breakpoint information indicative of a per-program breakpoint of the compressed data based on specified information indicating per-program breakpoint of the data read out;
   recording the compressed data to a predetermined first recording medium;
   generating first management information for managing the operation of read/write from/to the first recording medium in such a manner that the compressed data in the first medium are managed per program based on the breakpoint information;
   generating, based on the first management information, second management information to manage the compressed data per program in a second recording medium; and
   sending the compressed data in the first recording medium and the second management information to the second recording medium.

7. The method according to claim 6, further comprising recording the compressed data and the second management information to the second recording medium in such a manner the data is managed per program.

8. The method according to claim 7, further comprising generating the breakpoint information according to a data format specified for the second recording medium.

9. The method according to claim 6, further comprising:
   recognizing a break of each program unit based on a predetermined type of information inserted in output data from the source output unit and by which the per-program break can be recognized; and
   generating the breakpoint information based on the result of recognition.

10. The method according to claim 6, further comprising:
    reading a predetermined third recording medium to which there are recorded pre-compressed data and management information for management of the pre-compressed data per program;
    recognizing the per-program break based on the management information read from the third recording medium by the source output unit; and
    generating the breakpoint information based on the result of recognition.

* * * * *